T. W. ATTERBURY & P. W. MATTHEWS.
FURNACE.
APPLICATION FILED JULY 5, 1912.
1,160,360.
Patented Nov. 16, 1915.
16 SHEETS—SHEET 10.
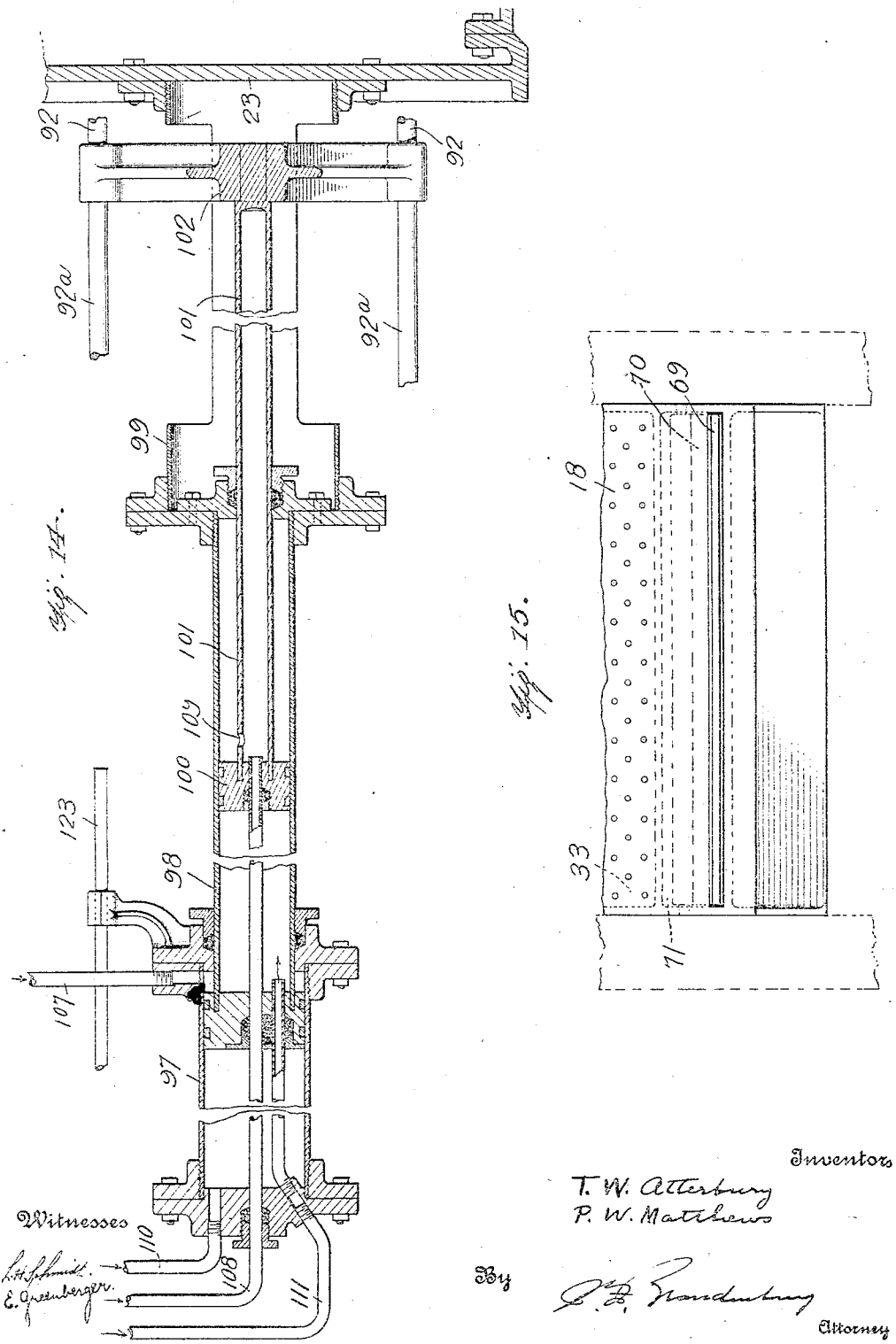
Witnesses
L. H. Schmidt
E. Greenberger
Inventors
T. W. Atterbury
P. W. Matthews
By J. B. Brandenburg
Attorney

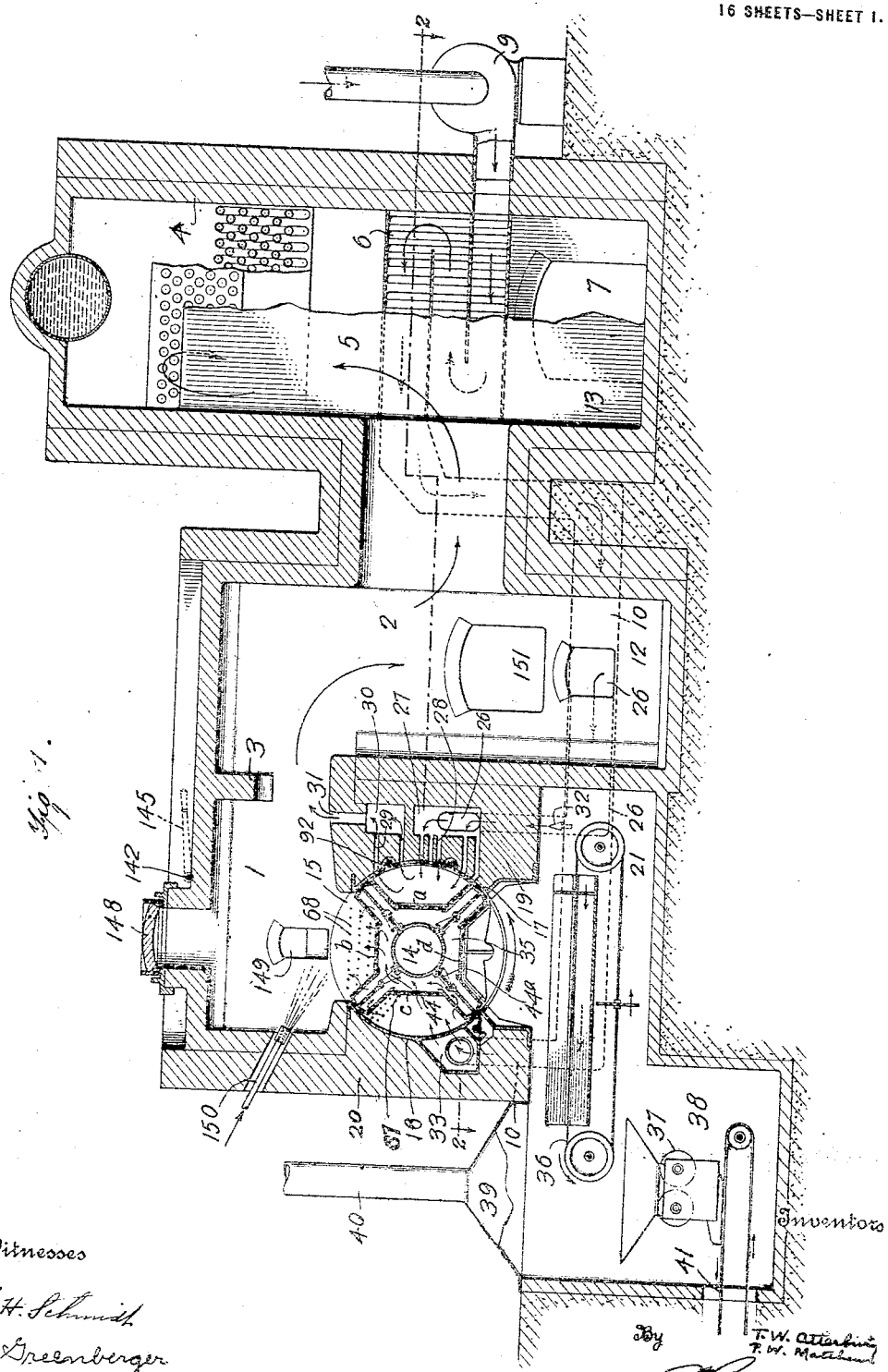

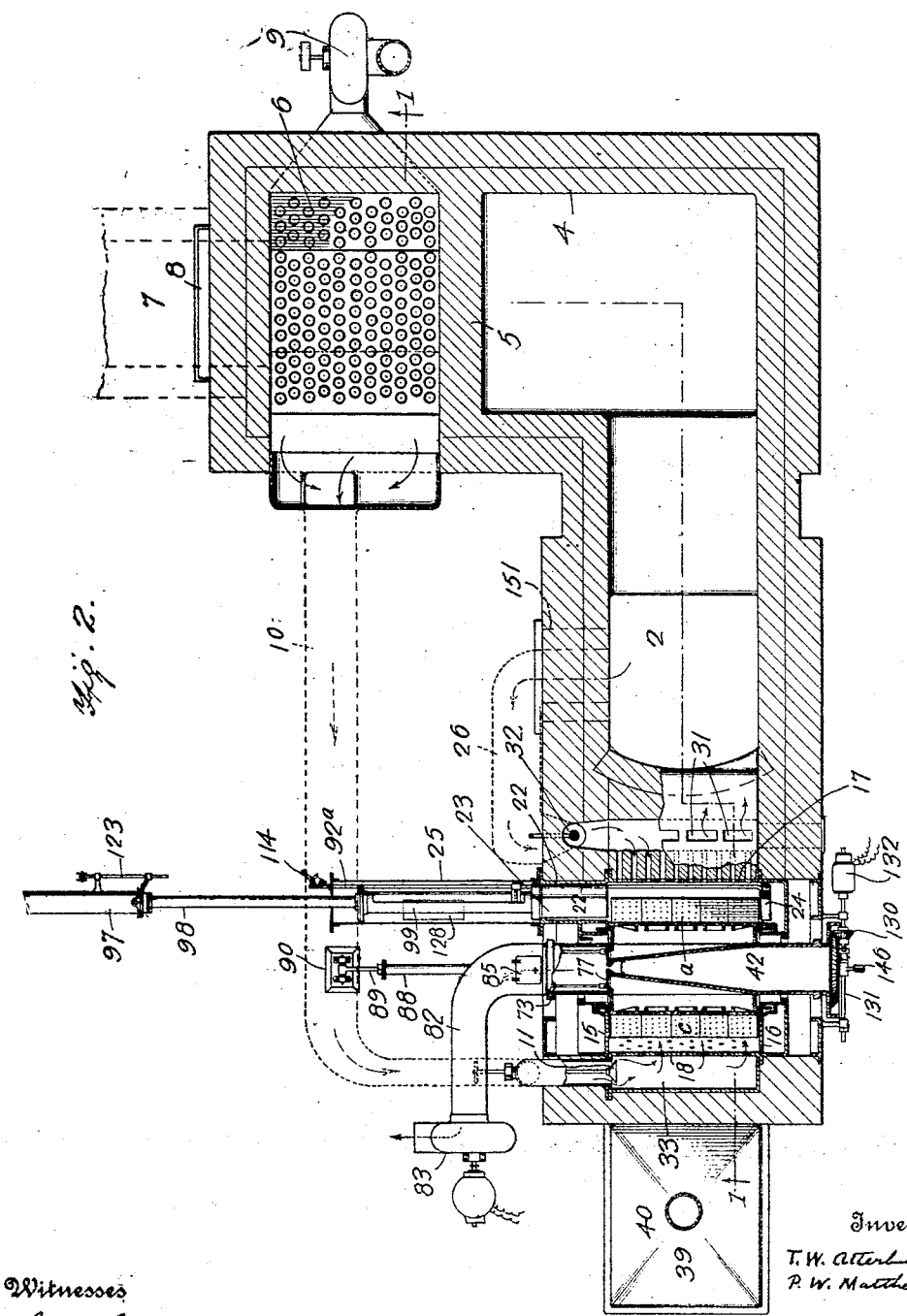

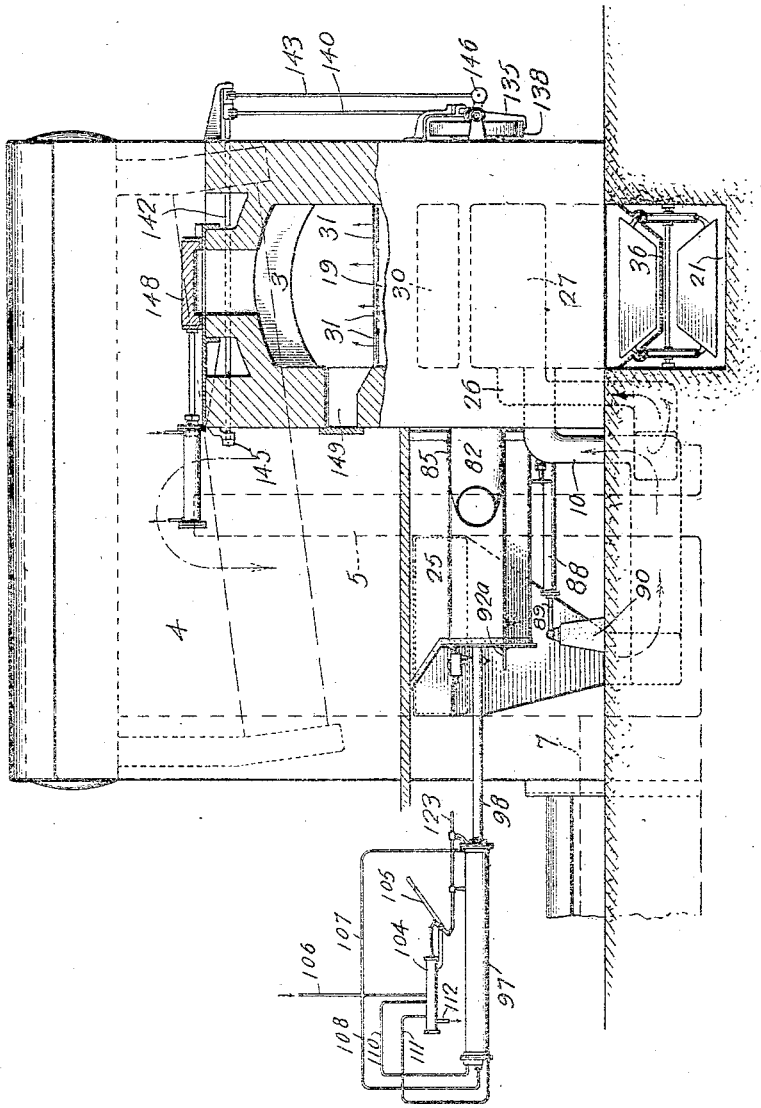

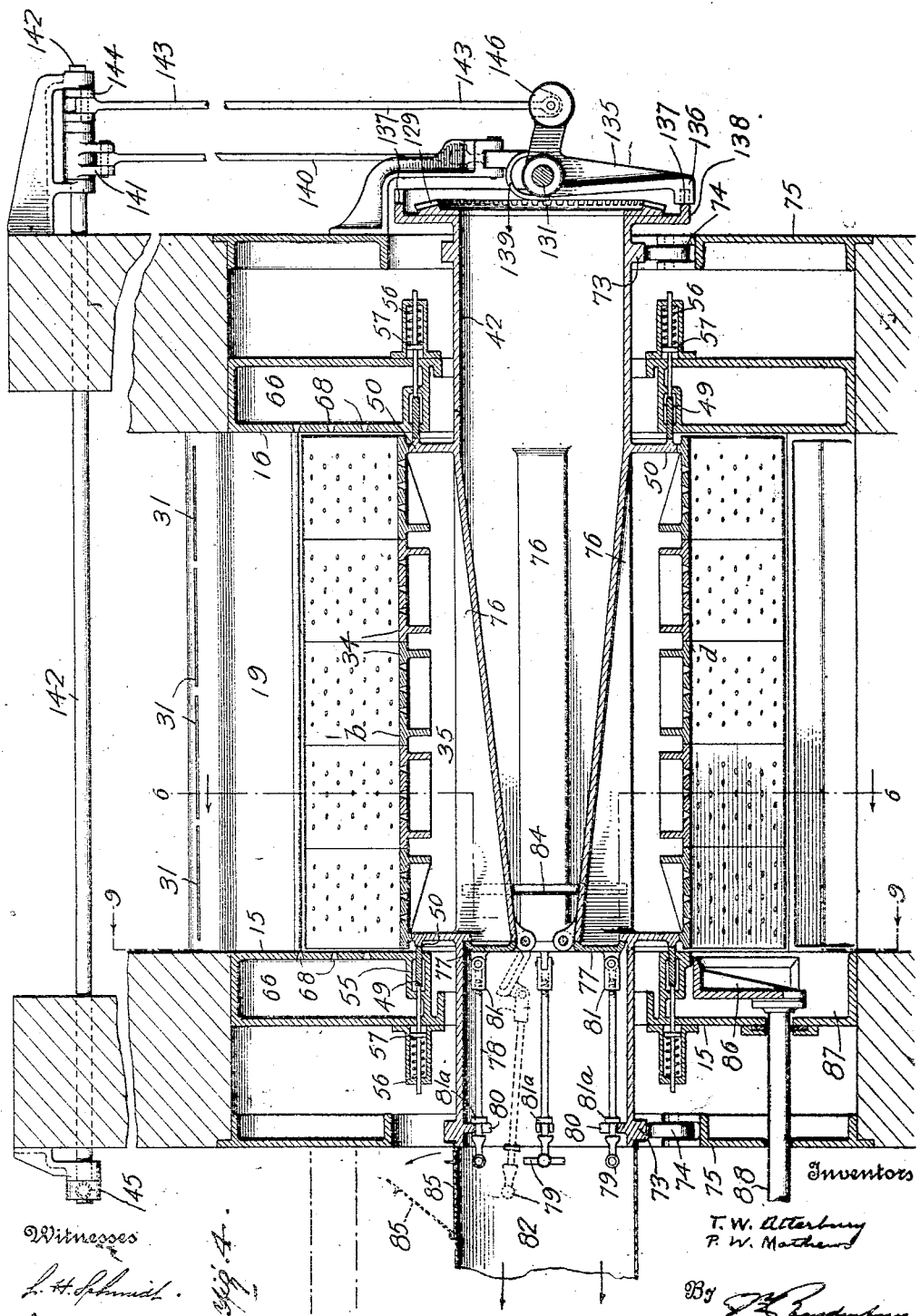

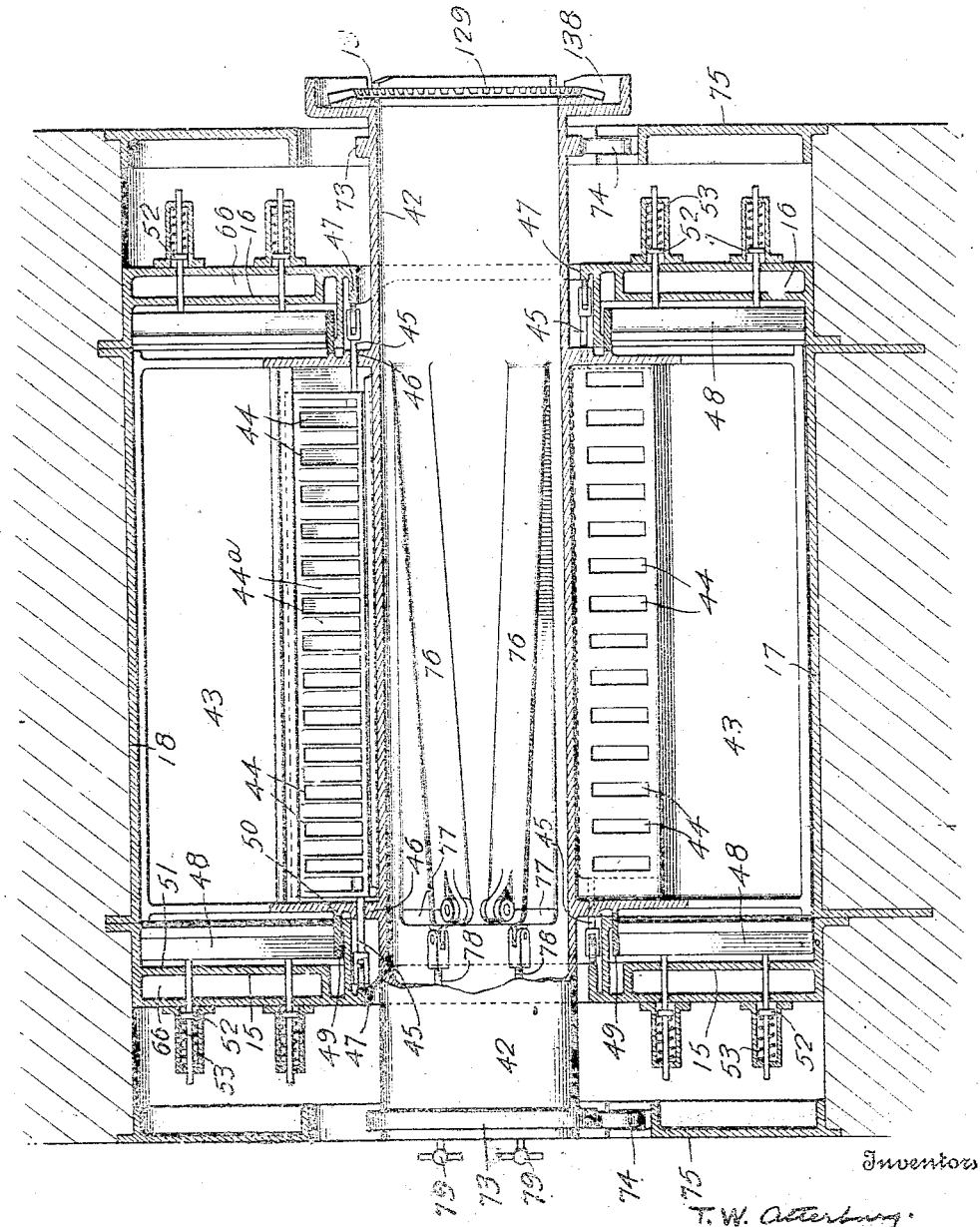

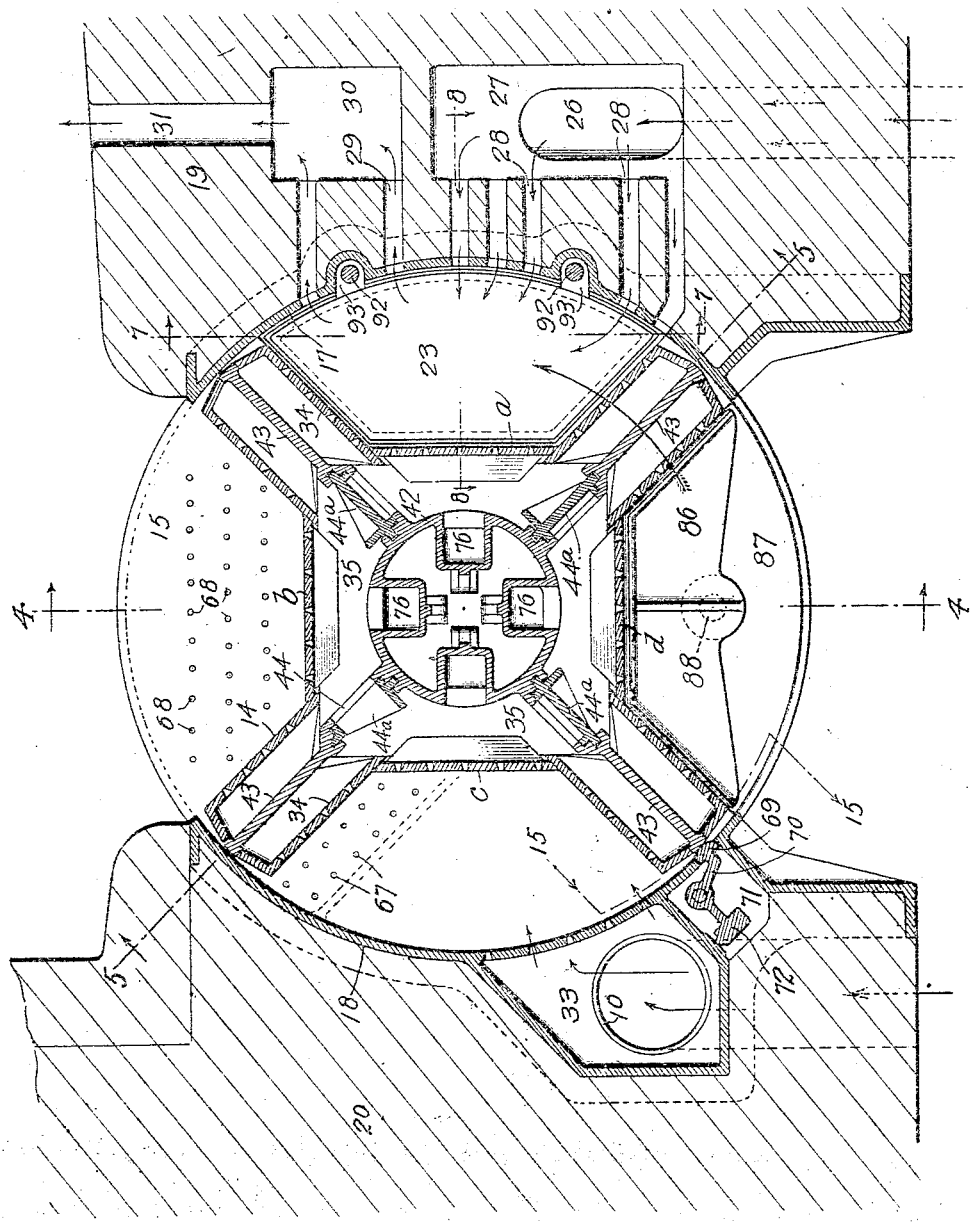

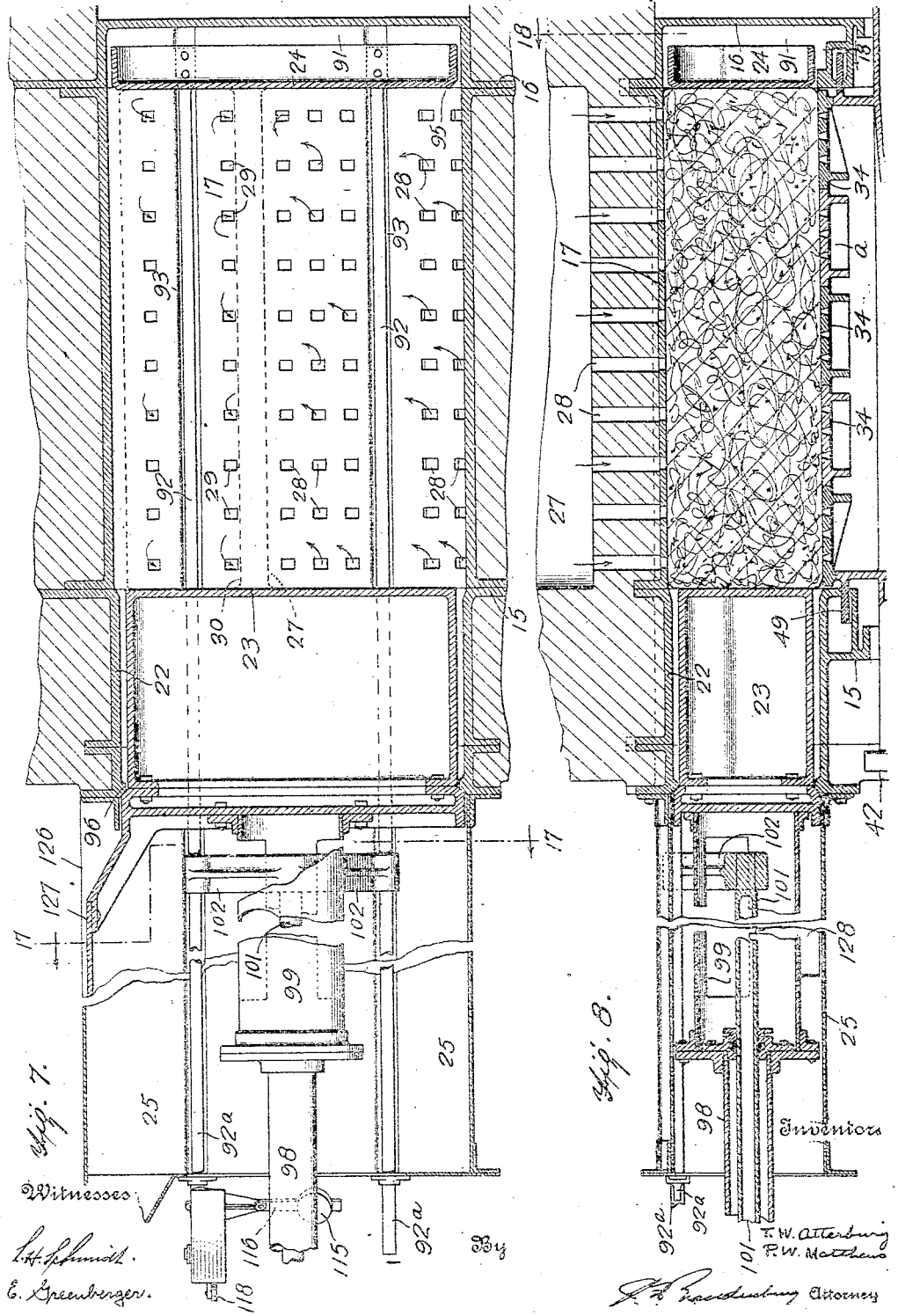

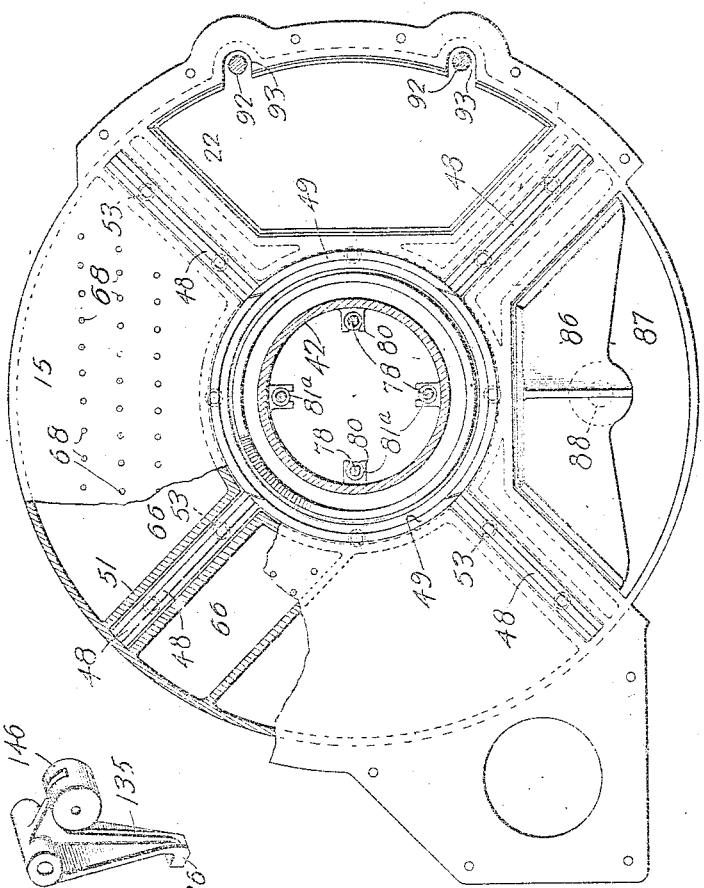
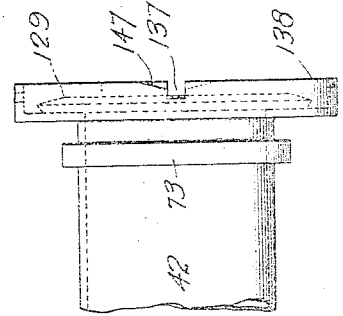
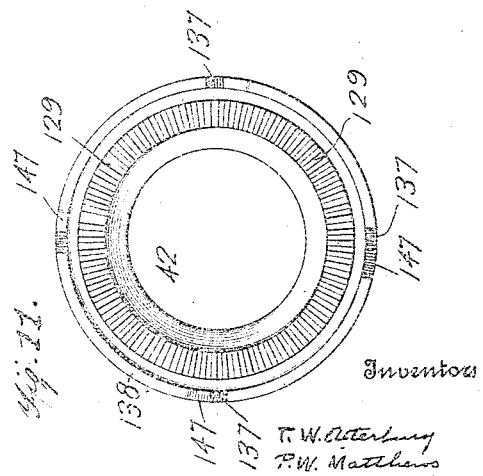

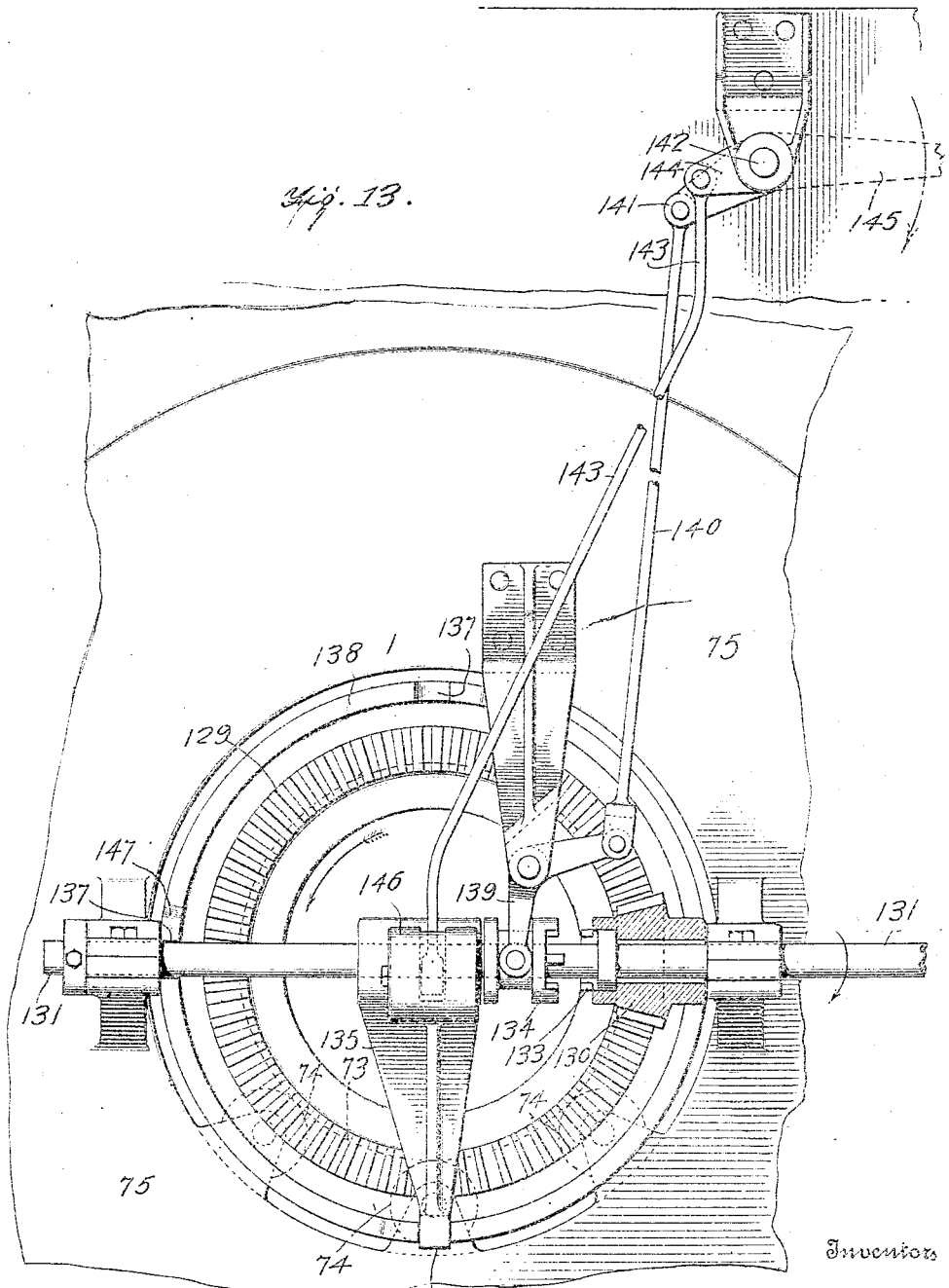

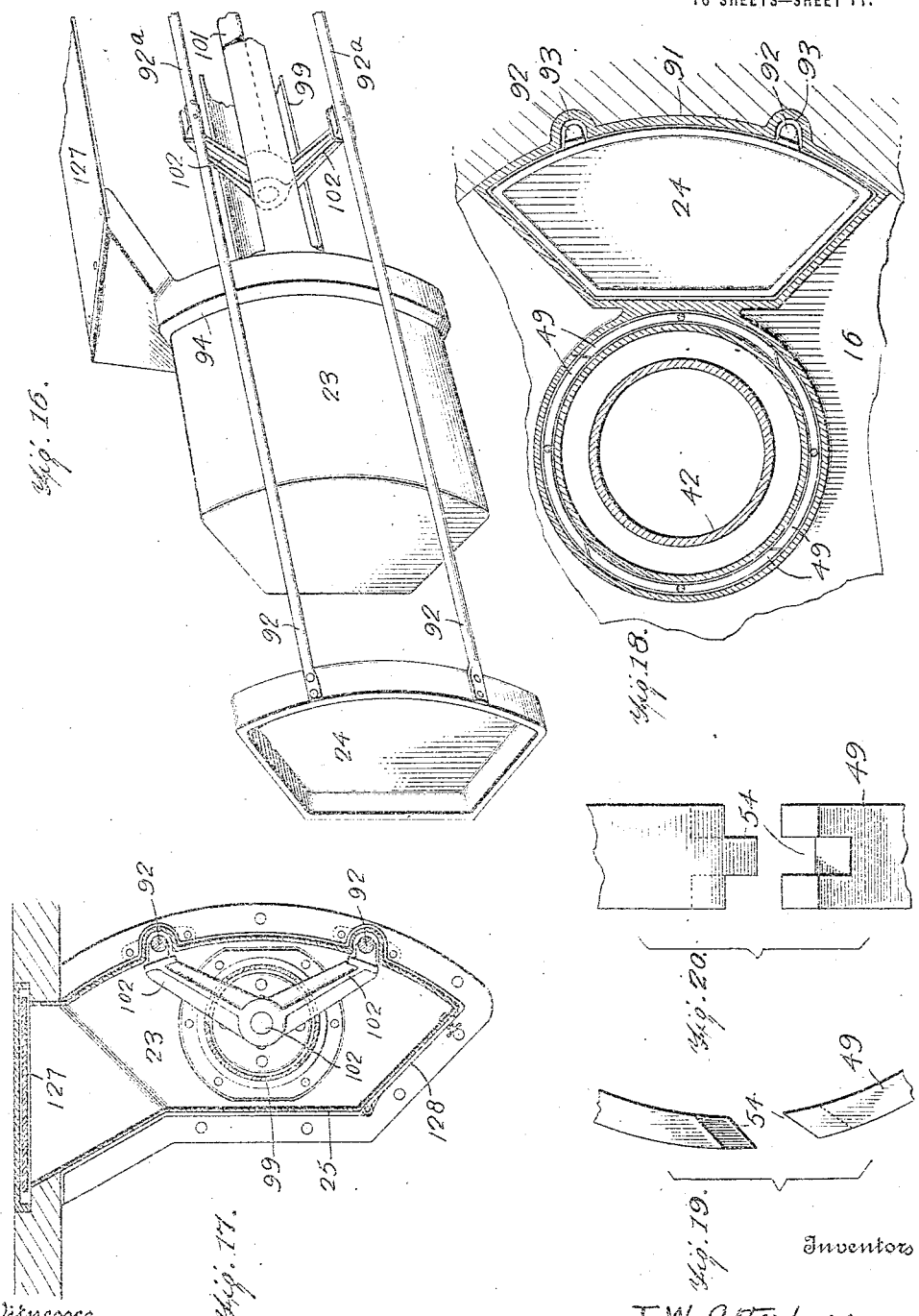

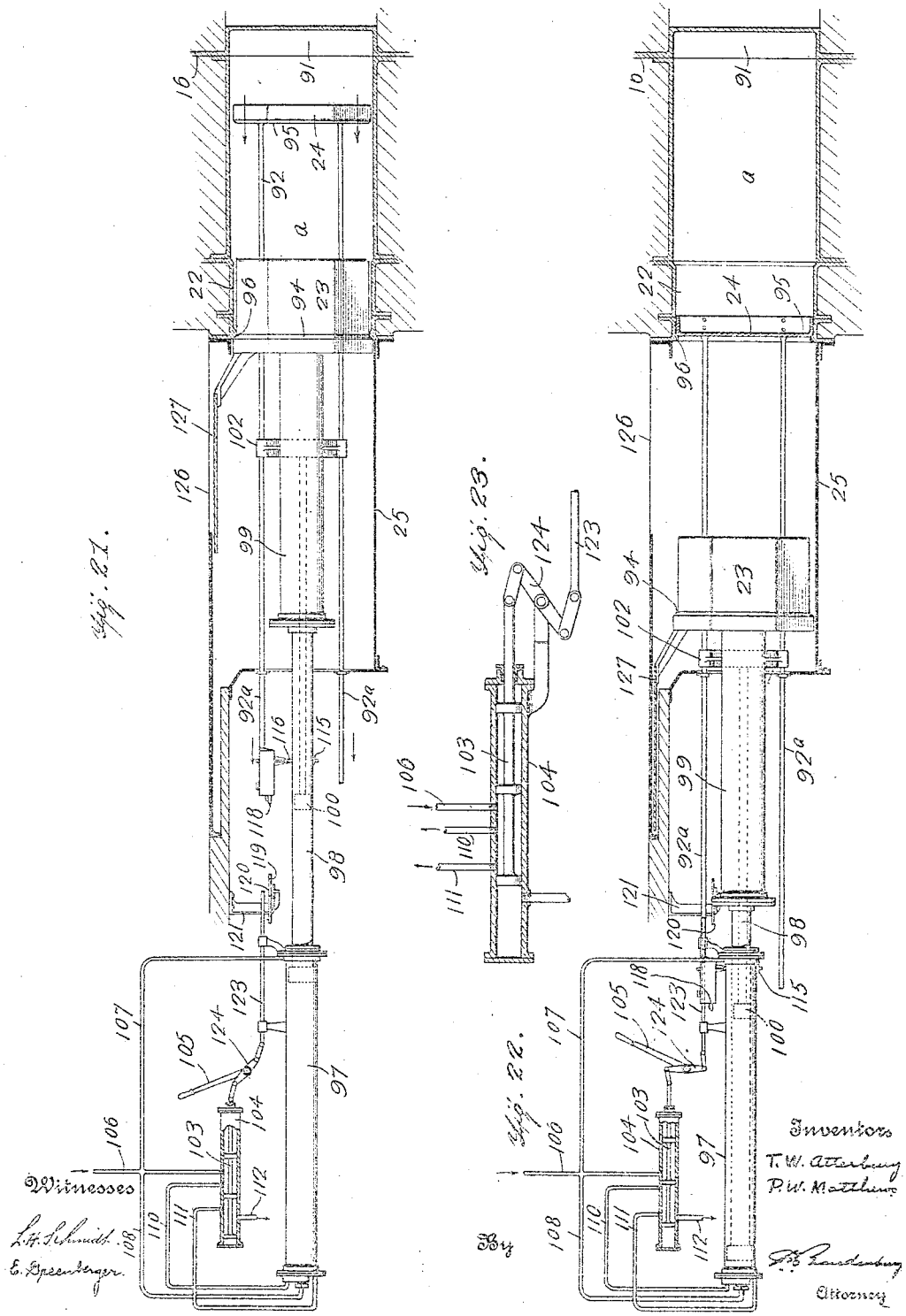

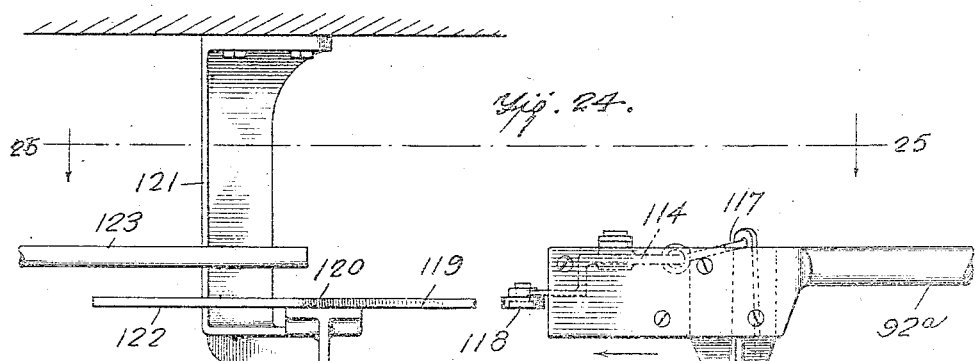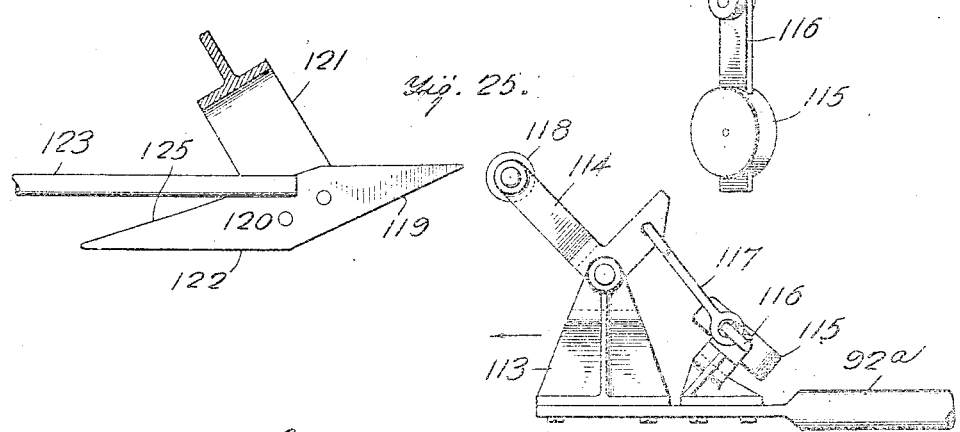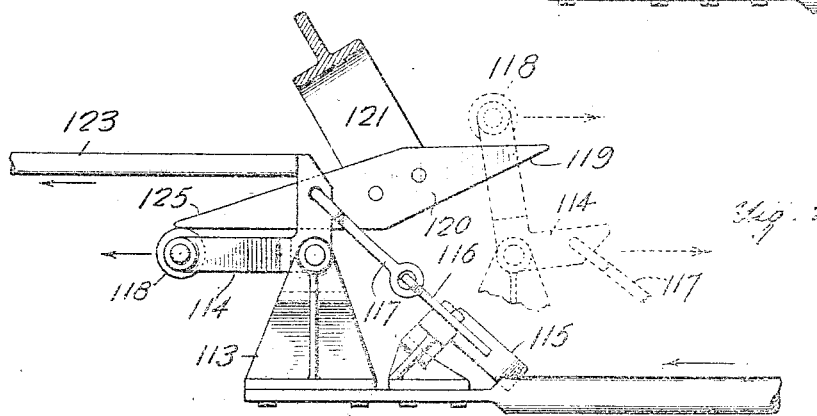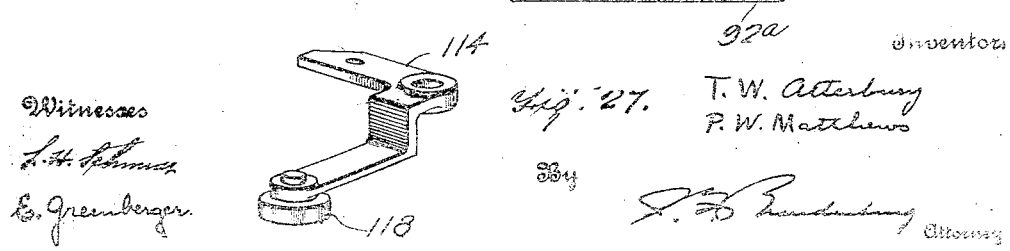

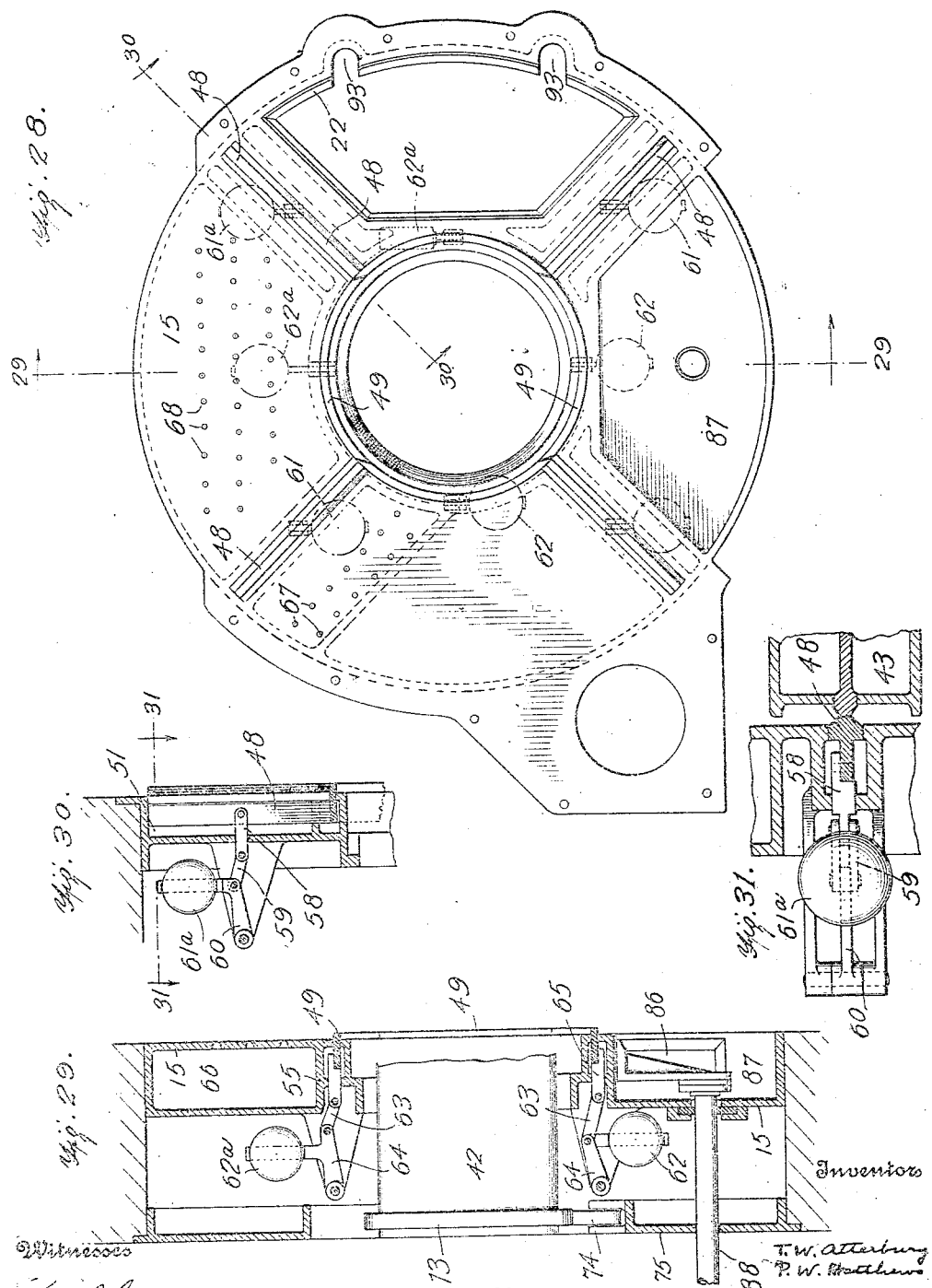

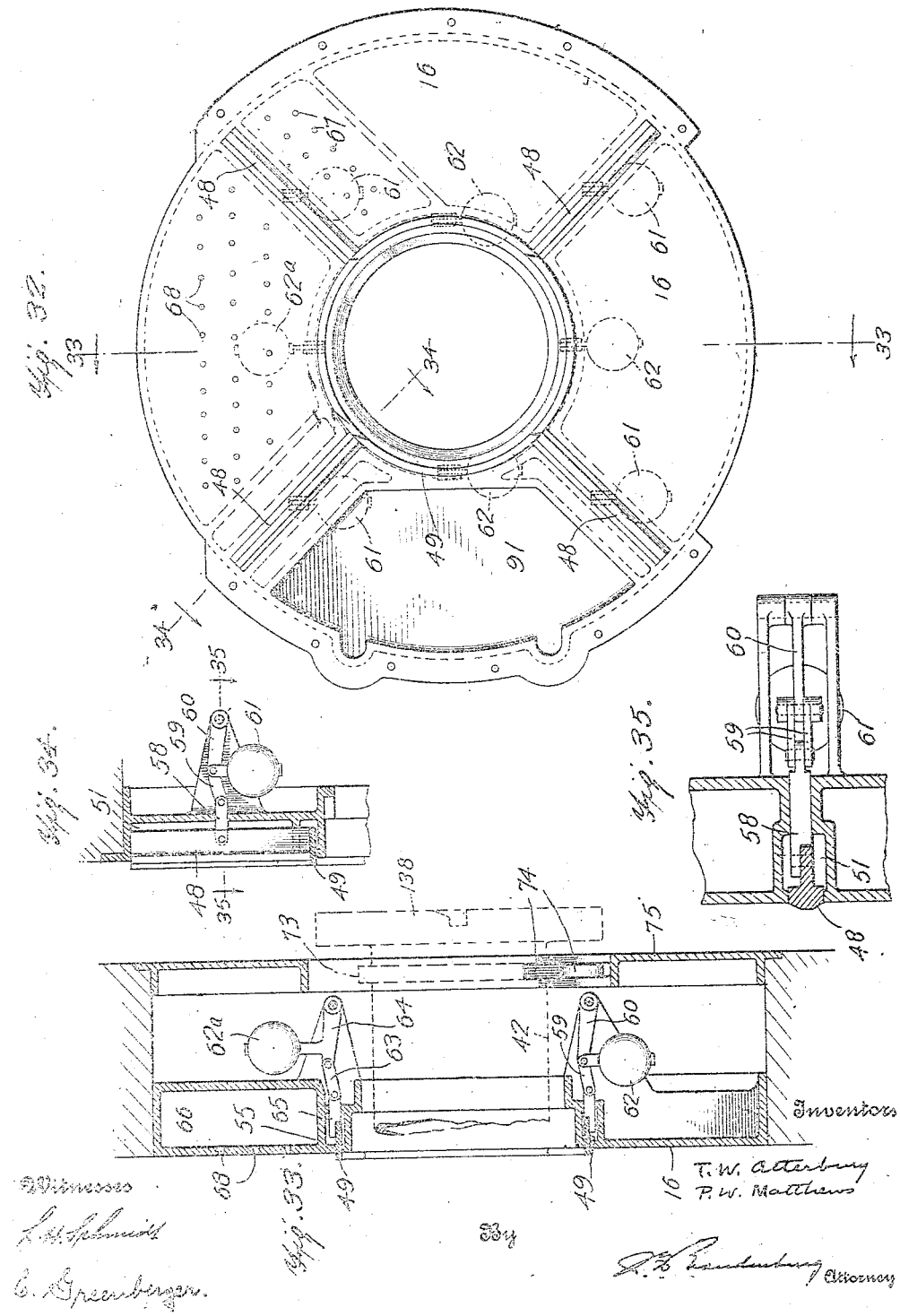

T. W. ATTERBURY & P. W. MATTHEWS.
FURNACE.
APPLICATION FILED JULY 5, 1912.
1,160,360.
Patented Nov. 16, 1915.
16 SHEETS—SHEET 16.
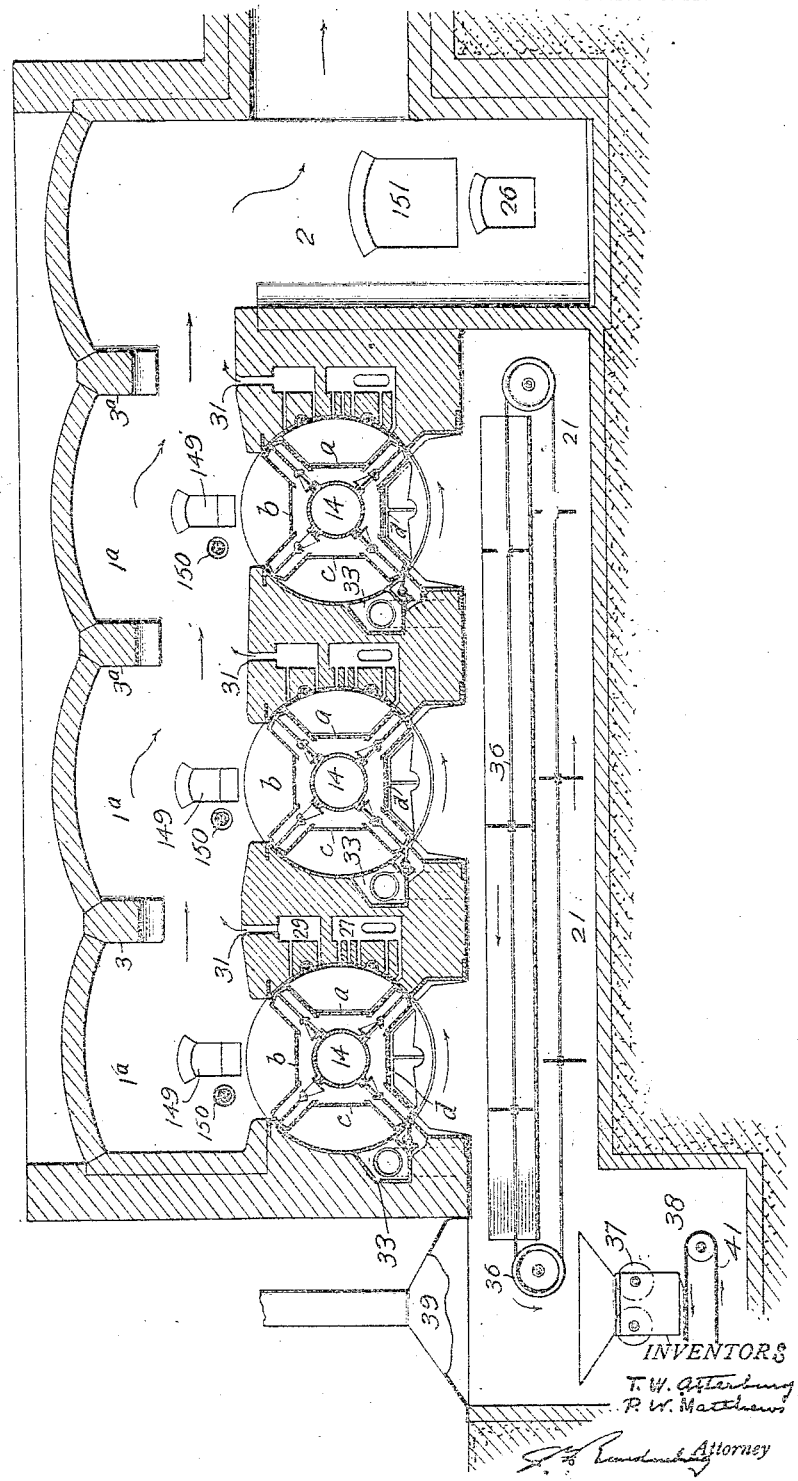
WITNESSES
INVENTORS
T. W. Atterbury
P. W. Matthews
Attorney

UNITED STATES PATENT OFFICE.

THOMAS W. ATTERBURY AND PERCY W. MATTHEWS, OF DANSVILLE, NEW YORK, ASSIGNORS OF FIVE-TWELFTHS TO SAID MATTHEWS, FIVE-TWELFTHS TO FREDERICK EMMET BEDALE, OF SCOTTDALE, PENNSYLVANIA, AND ONE-SIXTH TO JOSEPH FRANKLIN BRANDENBURG, OF MAHWAH, NEW JERSEY.

FURNACE.

1,160,869.

Specification of Letters Patent.

Patented Nov. 16, 1915.

Application filed July 5, 1912. Serial No. 707,697.

*To all whom it may concern:*

Be it known that we, THOMAS W. ATTERBURY and PERCY W. MATTHEWS, subjects of the King of Great Britain, both residing at Dansville, in the county of Livingston and State of New York, have invented certain new and useful Improvements in Furnaces, of which the following is a specification.

This invention relates to furnaces, the improvements embraced therein being designed more particularly for embodiment in refuse destructors, or furnaces for burning mixed city refuse. The disposal of mixed city refuse by the destructor method is a matter of burning poor fuel, for which purpose the maintenance of a steady and comparatively high temperature is greatly to be desired. It has been a defect of previous destructors that the temperature and pressure in the furnace chamber could not be kept uniform for any considerable period, because of the comparatively frequent necessity of opening doors into the furnace, as for charging, stoking, raking the more or less dried material from drying-hearths onto the grate, removing the clinkers from the furnace, etc. Furthermore it was necessary to shut down the forced draft during some or all of these operations, because of the furnace being open, and to reopen and adjust the draft valve after closing of the doors. Also, the opening of furnace doors permitting the escape of dust and obnoxious gases, constituting a serious nuisance. Moreover in the operations of introducing the fresh charge into the furnace, transferring the material from the drying hearth, where one was employed, to the grate, dumping or otherwise removing the clinker or burned material from the grate, and removing the clinker from the cooling chamber, where one was provided, which operations were not performed simultaneously, considerable time was lost, owing to the process being interrupted while the furnace was open, the draft cut off and the grate out of commission. These operations required the services of several men in different places.

The object of this invention is to provide an apparatus the operation of which amounts to a continuous process, one charge immediately following another, each a step behind the preceding in the cycle of operations, the several transfers of successive charges from one stage to the next being effected simultaneously, without necessarily involving opening of doors or shutting off of draft and with the possibility of maintaining uniform and comparatively high temperature and pressure in the furnace chamber. In this way the efficiency of the furnace is increased very materially by avoiding wide fluctuations in temperature and by maintaining the pressure in the furnace, and by saving time and conserving heat by not allowing the burning to be interrupted for any considerable period. Furthermore there is a decided improvement in the absence of escaping dust and odors. With such a plant charging, stoking, clinkering, etc., are simplified or eliminated, time and labor are saved, and in fact all the operations of the apparatus may be placed under the control of one man at one part of the building.

In refuse destructors made after our invention the new charges are preferably not admitted directly to the furnace or combustion chamber, but are introduced into a separate chamber or container where they may be dried before admission to the furnace chamber, so that the furnace chamber need not be opened in charging and (if the charges are preheated) the effect of wet new material on conditions in the furnace need not be taken into account. The more or less dried charge is next transferred to the furnace chamber and there burned to a clinker, after which the clinker is removed from the furnace chamber and the forced draft for combustion passed through it, with the dual object of cooling the clinker and utilizing the heat surrendered by it to raise the temperature of the air. The cooled clinker is dumped or discharged and its lumps are broken up in a disintegrator or crusher, and in accordance with the invention this takes place in a sealed chamber, so that the nuisance of dust and smoke escaping into the building is avoided. The various transfers of the charges, both before and after burning, are performed mechanically, without necessitating the opening of any doors into the furnace, and the initial operation of charging is conducted in such a manner that escape of gases or admission of cold air to the furnace is prevented. The operation of the destructor is in effect automatic, because after the charging, which is preferably performed mechanically or by power, each charge is caused to progress through the various stages from the state of wet material to that of cooled and discharged clinker without the necessity of access to the interior of the furnace; and it is also continuous, both in the sense that conditions in the furnace chamber are practically undisturbed by the removal of the clinker from the furnace chamber and the introduction of new material, and in the sense that the charges follow each other immediately in unbroken succession. As much pressure as may be desirable may be maintained in the furnace chamber because the furnace chamber is always sealed and consequently there is substantially no outrush of gases and fall of pressure in charging and clinkering.

The pre-heating or drying of the charges, it may be noted in the construction illustrated herein, is accomplished by diverting part of the combustion gases, preferably from the hottest part of the furnace, by draft inducing means, such as a steam jet, and causing this hot draft to flow through the successive fresh charges while in the separate pre-heating chamber, the volatile gases being delivered into the main body of gases flowing from the furnace or combustion chamber. However, this may be varied.

For carrying out our invention we employ an intermittently movable progressive compartment grate and a coöperative grate-setting or incasing structure, which together form a series of separate chambers appropriated to separate operations of the combustion process and afford exact and definite control of the draft and pressure effects with respect thereto. The grate comprises a series of compartment sections or grate units which are separated from each other by draft-intercepting walls and are movable in a vertical circuit, at intervals and by proportional distances, so as always to occupy a series of predetermined positions wherein their draft-intercepting walls coöperate with the walls of the incasing structure in the manner set forth. As hereinafter described, automatic means are provided for opening and closing draft passages in the grate to or between the compartments according to their positions, and means for sealing between the grate and the incasing structure make more effective the separation of the chambers and the control of the draft. Preferably this compound progressive grate is a rotary structure best formed of a drum supported to rotate about a horizontal axis and four or other suitable number of grate compartments carried thereby.

Means, as a wall or casing are provided to coöperate with the draft-intercepting walls of the grate cutting off the grate compartment or compartments before reaching the furnace chamber from communication therewith; and preferably such means coöperate successively with the grate units to form an inclosed chamber or chambers into which the material is charged and in which the successive charges are dried or pre-heated by the passage therethrough of heated fluid. This means is desirably in the nature of a wall with an arcuate face extending over a suitable arc of the compound grate, which wall may be of masonry faced with metal or it may be part of a suitable casing within which the grate turns. Similarly the section or sections at the far side of the furnace chamber are cut off from direct communication therewith, and as at the near side of the said chamber, the means are preferably in the nature of an arcuate wall or other structure covering said grate section and forming an inclosed chamber or chambers therewith. Hereinafter we describe a mode of utilizing such chamber for the purpose of cooling the burned material or heating the forced draft by causing the air or cooling fluid to pass therethrough. The casing, or inclosing structure leaves one grate section uncovered, preferably the top section, which occupies the furnace chamber and constitutes the burning grate. It also preferably leaves the bottom section uncovered, so that the material is removed therefrom by gravity, the section being inverted. The charging and pre-heating or drying grates and the cooling or draft-heating grate are preferably at the up-going and down-going sides, respectively, and the wall or casing structures coöperating therewith to form the charging and drying chamber and cooling chamber constitute guards for preventing the material from falling out.

From the foregoing it will be understood that in the particular embodiment of the invention herein exemplified each grate section constitutes in turn a charging and drying grate, a burning grate, a cooling grate and a dumping grate; and that successive step by step movements of the compound grate carries the successive charges through these stages. At any one time the compound grate hereinafter described exhibits all of these phases, and movement by one step simultaneously advances the grate then in charging or drying position with its dried or pre-heated charge into the furnace chamber, the burning grate with its burned charge or clinker from the furnace chamber to the cooling chamber or position the cooling grate with the cooled clinker to dumping position, and the previously dumped grate to charging position. It should be borne in mind, however, that the number of the grate compartments and the specific functions performed may be varied or one or more of them omitted. If, for example, the character of the material or conditions are such that preliminary drying is not required, the preheating provisions need not be embodied. Nor do we limit our invention to refuse destructors, since it will be apparent that similar apparatuses and similar or analogous functions may be utilized for other purposes.

As hereinbefore indicated, sealing means are provided to prevent leakage of air and gases around the sides and periphery of the grate and between the sections thereof; and means are also provided for controlling the distribution or the course of the draft in the interior of the compound grate. Thus, the draft passes through the material in the cooling section or unit, and is thence admitted to the burning section where it supports combustion; while communication between the cooling section and the section that has passed beyond is cut off. Communication is also cut off between the burning section and the charging section, so as to avoid escape of gases or inrush of air when charging, and between the drying section and the adjoining sections, so that the hot blast for pre-heating the material is caused to pass as intended. Such means for controlling the communication between the sections is preferably in the nature of the draft-intercepting walls separating the grate sections, together with automatic valve or damper mechanism for establishing draft-communication between the sections at certain times.

The invention also includes novel mechanism for charging the material into successive sections of the progressive grate or carrier. The sections or compartment units are preferably trough-shaped, with open tops and ends; and the charging mechanism operates transversely of the grate through the ends of these sections. The mechanism comprises a container, which may consist mainly of opposite charge end retainers, and which is movable to carry a fresh charge into the grate unit, being adapted to straddle the grate, so that the latter when advanced carries the charge from between the end members into the next position. The said end members are provided with or have secured thereto inner and outer seals or doors for tightly closing the entrance to the charging chamber, and operating means are provided whereby said end members are retracted successively so that the outer seal movable with the outer member is not moved outward from the entrance until the inner member and seal have completed or substantially completed their outward movement, to close the entrance while a new batch of material is being received between the end members for introduction into the next grate section. The construction and arrangement of the charging mechanism and the operating and controlling means therefor embrace numerous features of novelty, which will hereinafter be described.

A closed chamber or pit cut off from the furnace chamber is provided for dumping the cooled clinker, and in this chamber or in another sealed chamber communicating therewith is located a disintegrator to which the clinker is automatically delivered.

Novel means are provided for blowing dust or fine material out of the grate by means of the forced air draft, and numerous other novel features will become apparent as the specification proceeds.

Having thus briefly described the general nature of our invention, we will now proceed to a detailed description of what we believe to be the most desirable practical embodiments of the features thereof, it being understood that numerous other concrete embodiments may be designed without departing from essentials.

In the accompanying drawings illustrating the preferred constructions and arrangements of the parts: Figure 1 shows a vertical transverse section through the destructor, on the line 1—1 of Fig. 2; Fig. 2 is a horizontal section on the line 2—2 of Fig. 1; Fig. 3 is a side elevation with a part in section; Fig. 4 is a vertical section on the line 4—4 of Fig. 6, the plane of the section passing through the axis of the rotary grate; Fig. 5 is a section on the line 5—5 of Fig. 6; Fig. 6 is a section on the line 6—6 of Fig. 4; Fig. 7 is a section on the line 7—7 of Fig. 6; Fig. 8 is a section on the line 8—8 of Fig. 6; Fig. 9 is a section on the line 9—9 of Fig. 4, part being broken away; Fig. 10 is a side elevation of the portion of the grate-supporting drum at the driving end thereof; Fig. 11 is a face view of Fig. 10; Fig. 12 is a detail perspective view of the weighted detent lever shown in Fig. 13; Fig. 13 is a fragmentary elevation of the back of the furnace, showing the mechanism for operating and controlling the grate; Fig. 14 is a longitudinal sectional view through the cylinders and plungers for operating the charging mechanism; Fig. 15 is a fragmentary interior face view of the casing in which the grate turns, showing in front elevation the transverse sealing strip shown in section in Fig. 6; Fig. 16 is a detail perspective view of the charging members; Fig. 17 is a vertical section through the charging receptacle on the line 17—17 of Fig. 7; Fig. 18 is a vertical section on the line 18—18 of Fig. 8; Figs. 19 and 20 are detail views showing the joint between two sections of an expansion or sealing ring; Fig. 21 is a sectional side elevation showing the charging arrangements as a whole and in their relation to the grate; Fig. 22 is a view similar to Fig. 21, showing the parts in changed positions; Fig. 23 is a detail sectional elevation showing the controlling valve; Fig. 24 is a detail side elevation showing an automatic tripping mechanism utilized in connection with the charging mechanism; Fig. 25 is a sectional plan on the line 25—25 of Fig. 24; Fig. 26 is a similar view showing the parts in changed positions; Fig. 27 is a detail perspective view of the tripping lever; Fig. 28 is an inner face view of one of the side casings, showing means alternative to that of Figs. 4 and 5 for yieldingly pressing the sealing or expansion members; Fig. 29 is a vertical section on the line 29—29 of Fig. 28; Fig. 30 is a section on the line 30—30 of Fig. 28; Fig. 31 is a section on the line 31—31 of Fig. 30; Fig. 32 is an inner face view of the other side casing; Fig. 33 is a vertical section on the line 33—33 of Fig. 32; Fig. 34 is a section on the line 34—34 of Fig. 32; Fig. 35 is a section on the line 35—35 of Fig. 34; and Fig. 36 is a view similar to Fig. 1, showing an arrangement of series of grates in a common furnace chamber.

The numeral 1 indicates the furnace chamber, which, in refuse destructors, is a brickwork chamber or species of Dutch oven, 2 is a secondary combustion chamber in which the gases are thoroughly mixed and combustion is completed, 3 is a deflecting arch, projecting downward from the roof of the furnace between the furnace and combustion chambers for promoting the mixture of the air and gases, 4 is a boiler setting with a water tube boiler therein, 5 is a bridge wall in the boiler setting, 6 is a pre-heater through the tubes of which the products of combustion are passed on their way to the stack, and 7 is a flue leading to the stack and controlled by a valve 8. A blower 9 supplies the forced draft and may be used also as a ventilator fan, drawing the foul air from the building. The air is forced between the tubes in the pre-heater 6 and through the flue 10, which is controlled near its discharge end by the valve 11. The secondary combustion chamber and the boiler setting are provided with ash pits 12 and 13. The foregoing or similar arrangements are customary in destructors.

The progressive grate 14 constituting an important feature of the invention is shown as a rotary structure comprising four compartments, sections or units, lettered $a$, $b$, $c$ and $d$. These sections or grate units are all similar and all perform the same functions, but at different times, and are separated from each other by draft-intercepting walls, as hereinafter more particularly described. The section occupying the position $a$ is always the charging and drying grate, that occupying the position $b$ is the burning grate, that of position $c$ the cooling grate, and that of position $d$ the dumping grate. The grate is caused to progress in this instance by rotary motion in the direction indicated by the arrow. The grate is rotated in a step by step manner, each movement being sufficient to remove one grate section from the furnace chamber and to carry the succeeding grate section into burning position therein, and the periods of rest between advancing movements are sufficient to enable each new charge to be burned to a clinker, or they may be as long as desired. The grate compartments are charged in succession, and each compartment constitutes in turn a drying or pre-heating grate, a burning grate, a cooling grate and a dumping grate.

The grate rotates within a suitable casing structure in the interior of the furnace. As shown, there are side casings 15 and 16 set into the front and back walls of the furnace adjacent or contiguous the sides of the grate, and what may be termed peripheral casings 17 and 18, constituting facings for walls 19 and 20 at the "near" and "far" side of the furnace chamber with respect to the direction of travel of the grate units. The side and peripheral casings may be bolted together and may be secured in place in any suitable manner. The inner surfaces of the walls 19 and 20 with their casings 17 and 18 conform to the grate over suitable arcs, that is to say, they are curved in arcs about the axis of the grate as a center and are adjacent or contiguous the peripheral portions of the grate, which in this instance are merely the outer edges of the divisions between the grate compartments. Thus, these wall or casing provisions serve to separate the grate sections from the furnace chamber before entering and after leaving the same, and coöperate with the grate segments thus shut of from the furnace chamber to form closed boxes or chambers. In the particular construction shown there is but one grate segment so closed prior to entrance into the furnace chamber, namely, the segment $a$, and but one closed beyond the far side of the said chamber, namely, the segment $c$, but this may be otherwise.

The closing of the grate compartments at the near side of the furnace chamber affords a confined charging chamber, and also a confined chamber for preliminary treatment of the material by the passage of suitable gaseous fluid therethrough. Preferably one chamber serves both purposes. Thus, the chamber formed by the casing or walls coöperating with the section $a$ is both a charging chamber and a pre-heating or drying chamber. It is provided at one end with an entrance 22 opening through the side casing 15 and the front of the furnace, (see Figs. 2, 7, 8 and 9) through which it is charged by charge end retainers 23, 24 (see Figs. 21 and 22) constituting a container movable to carry a charge from a charging receptacle 25 into the grate segment and to return for a new charge. After introducing a charge into the grate segment the charging members or container straddle the grate, as will be hereinafter more fully described, so that the grate is free to advance a step so as to carry the new charge into the furnace chamber, there to be burned. The entrance to the charging chamber is closed to prevent influx of air and escape of gases, as will be presently described. Hot gases are passed through the charge in the inclosed chamber at position $a$, as by means of a flue 26 arranged to conduct combustion gases, a space 27 in the wall 19 communicating therewith, passages 28 leading from said space and opening through perforations in the lower part of the casing 17, other perforations and passages 29 through the upper part of said casing, a separate space 30 in the interior of the wall, and openings 31 through the top of said wall to return the gases to the furnace chamber where the main body of gases is flowing from it to the combustion chamber, together with a steam jet 32, supplied by the boiler, to induce a flow through these flues and passages. The flue 26 preferably leads from the combustion chamber so that the gases drawn through it are at a high temperature.

The inclosed box formed at position $c$ constitutes a clinker cooling or draft heating chamber. To this end the draft flue 10 opens into a chamber 33 in the wall 20 whence the air (which may have already been heated to a certain degree by passage through the pre-heater 6) passes through the hot clinker or material by way of openings in the casing 18, through the draft openings in the grate bars 34 forming the box-like grate unit into an air space 35 in the rotary grate, and thence through the grate bars forming the burning grate in position $b$ and through the burning charge carried thereby.

When the grate compartment occupying the position $c$ is moved by the next advancing movement of the grate to the inverted position at $d$, it dumps its cooled contents onto a conveyer 36 in the inclosed pit 21 and this conveyer delivers the material to a disintegrator 37, the same being a crusher of any suitable type for breaking up any large bodies. The disintegrator is located in a sealed chamber or pit 38, which may be regarded as forming part of the same inclosed or sealed space including the dumping pit 21. The pit 38 may be covered by a hood 39, from which dust and smoke may be led off through a flue 40 and discharged where they will not create a nuisance. From the disintegrator a conveyer 41 carries the material to any suitable point. By these provisions obnoxious dust and smoke from the clinkering operations are prevented from escaping into the building.

Having thus taken a general survey of the invention we shall now proceed to a more detailed consideration of certain of its parts.

*Grate construction.*—The construction of the grate, its casing and the draft sealing and controlling provisions are illustrated more particularly in Figs. 4, 5, 6, 9, 15 and 28 to 35. It may be termed in a general way a rotary drum grate, that is to say its compartments are disposed around and parallel to the horizontal axis of rotation and face outward with respect thereto. It is distinguished from a flat or circular grate rotatable about a vertical axis. The body of the grate is in the form of a drum 42 having radiating wings 43, the drum and wings constituting solid walls separating the grate compartments from each other. In the compartments thus formed are placed the box-like grate units formed of suitable grate bars 34, which are secured to the drum and wings in any appropriate manner. These grate units are in the nature of open-ended troughs, though they are not necessarily longer than wide, and their ends are closed by the side casings 15 and 16, except as to the grate segment in charging position $a$, where the ends are closed by the charging members 23 and 24. The bottom and inclined sides of each box-like grate unit are spaced away from the drum 42 and the wings 43 so as to leave the air space 35 already referred to. This air space is divided by the wings 43 into separate chambers, which are adapted to communicate with each other by openings 44 in the said wings controlled by automatic valves or dampers 44$^a$. These valves may be in the nature of damper slides, movable parallel to the axis of the drum and automatically operated by rods 45 operating through openings in flanges 46 on the drum, and bearing rollers which travel on cam tracks 47. The said cam tracks are so formed that the valve 44$^a$ between the cooling and burning sections $c$ and $b$ of the grate is always open while the valves between the burning and drying sections $b$ and $a$ and between the sections $a$ and $c$ and the dumping section $d$ are always closed. It should be noted that the grate bars 34 at the ends of each grate compartment both at the bottom and at the sides, fit closely against the supporting structure of the grate so as to prevent escape of air from the ends of the air space 35.

From the foregoing it will be seen that the rotary grate has internal draft controlling provisions, comprising in the first place the solid walls forming the compartments in which the grates are placed, and secondly the automatic dampers to establish draft communication between the sections where and when desired, and that the grate with its internal draft controlling provisions coöperates with external draft controlling provisions in the form of the external walls or casing parts inside which the grate turns. Furthermore, sealing means are provided between the rotary and stationary parts in order to prevent leakage of air and gases from one grate compartment to another and from one chamber to another. In the particular construction illustrated, radial sealing strips or plates 48 (see Figs. 5, 9 and 31) are provided between the grate sections for coöperation with the ends of the wings 43 and the side casings 15 and 16, and sealing rings 49 are disposed concentrically inside of the ends of the grate compartments for coöperation with annular flanges 50 on the grate drum and the side casings 15 and 16. The sealing or expansion plates 48 are preferably mounted in chambers 51 in the said side casings and are yieldingly projected to press against the end edges of the wings 43 by suitable means, such as plungers 52 operated upon by springs 53. The heads of the plates are beveled on the side edges as shown in Fig. 31, so as to permit the wings 43 to ride past them. The extent of projection of the sealing plates is limited so that they cannot bar the movement of the wings. The rings 49 are made in sections as shown in Figs. 9, 18, 19 and 20, to allow for longitudinal expansion, the sections thereof having suitable tongue and slot joints 54 to prevent leakage. The rings are mounted in suitable pockets 55 in the side casings 15 and 16 and are yieldingly pressed forward by suitable means, such as springs 56, acting on plungers 57.

As shown in Figs. 28 to 35, the sealing plates 48 and the sealing rings 49 may be yieldingly pressed inward by weights instead of springs. In these views the sealing plates 48 are shown as provided with rearward projecting stems 58 fixed thereto and pivoted to a link 59 forming part of a toggle, the other member 60 of which carries a weight 61. These weights 61 hang downward with the exception of the weights 61$^a$ which operates the sealing strip 48 over the entrance 22 to the charging chamber. In like manner, the several sections of the sealing ring 49 are pressed yieldingly forward by weights 62 acting upon toggles 63, 64 pivotally connected with stems 65 projecting rearward from the said ring sections. These weights 62 hang downward from the toggles with the exception of the three weights 62$^a$ which operate the uppermost ring sections at the two sides of the grate and the ring section adjacent the entrance to the charging chamber. The sectional construction of the rings 49 not only allows for expansion but insures a more uniform sealing joint all the way around than were the rings in one piece. The plates 48 and the rings 49 have a close sliding fit in the mouths of pockets 51 and 55 in which they are mounted, so that the fluids cannot escape around the sealing members by way of these pockets.

The upper parts of the side casings 15 and 16, opposite the ends of the burning grate $b$ and opposite a portion of the ends of the cooling grate $c$, inclose air chambers 66, which are provided in their inner walls with apertures 67 and 68 communicating, respectively, with the cooling and burning sections, so that a portion of the forced draft entering the cooling chamber at $c$ is diverted through these portions of the side casings to guard against overheating, this portion of the draft emerging through the openings 68 into the ends of the charge contained in the grate section at $b$.

The wings 43 approach as closely to the peripheral casings 17 and 18 as may be without danger of scraping against these stationary surfaces, and they may be sufficiently near to prevent material escape of fluid at these regions. In order to guard further against leakage, sealing provisions may, and preferably are, located at such points also. One transverse sealing member is shown at 69 in Figs. 6 and 15 to prevent escape of the forced draft between the grate and the casing 18 from the cooling chamber at $c$ into the clinker dumping chamber 21. This strip is shown operating through a slotted opening in the casing 18 and carried by a lever arm or arms 70 in a pocket 71, being pressed against the outer edge of the wing 43 by means of a weight 72. It will be obvious that transverse joint strips of similar or suitable construction may be arranged to coöperate with the outer edges of the wings 43, at their other positions.

The drum 42 is extended at both ends through central openings in the inner side casings 15 and 16, and is provided near its ends with track flanges 73 which rest on supporting rollers 74 journaled in outer side casings 75, (see Figs. 4 and 5).

*Grate cleaning provisions.*—Means are provided whereby the forced draft may be utilized to blow dust and fine material out of the grate sections and the air chambers beneath the same. To this end the several air chambers constituting the air space 35 in the interior of the grate are provided with longitudinal dust pockets 76, the bottoms of which are inclined toward the axis of the drum from one end toward the other. The ends of these pockets, which project into the interior of the drum, are provided with hinged doors 77, which may be opened by means of rods 78 having handles 79 (see Figs. 4 and 5). At their outer ends, the said rods 78 enter between lugs 80 and the inner ends of the rods have threaded engagement with socket 81 pivoted to the doors 77, so that by turning the rods the collars 81ᵃ thereon may be forced against the lugs so as to hold the doors closed. Opening of the ash door pertaining to either the grate compartment in cooling position $c$ or that in burning position $b$ enables the forced draft to blow accumulated fine material out of such portion of the grate. As shown in Figs. 2, 3 and 4, the dust thus blown out of the end of the drum may be conducted away through a duct 82, which has a substantially tight joint with the end of the drum and may, if necessary, be connected to an exhaust fan 83. A diaphragm 84 across the interior of the drum prevents the material being blown out of the other end thereof. A door 85 is provided in the top of the duct 82 to permit access to the handles 79. Instead of blowing the dust and ash out of the grate, it may be raked out of the pockets 76 by hand. Provision of a duct such as 82 for carrying the dust away from the interior of the building is desirable for sanitary reasons.

Plunger-operated means are provided for cleaning the grate section in dumping position of any material that may adhere thereto. As shown more particularly in Figs. 4 and 6, a scraper or pusher 86, conforming to the internal contour of the grate compartments and having sharp cutting edges, is normally located in a pocket 87 at one side of the grate and is operated by a fluid pressure cylinder 88, which may be attached to the cleaner, its piston rod 89 being pivotally anchored as shown at 90 in Fig. 2. The cylinder 88 has a tight sliding fit in an opening in the inner side casing 15 so as not to permit escape of gases around it from the dumping pit 21. While the simplest mode of removing the clinker from the grate is by permitting it to fall by gravity from the inverted grate section in position $d$, it will be obvious a device such as 86 might be employed to push it out endwise.

*Charging mechanism.*—The charging mechanism is illustrated more particularly in Figs. 2, 3, 7, 8, 14, 16, 17 and 21 to 27. As already described, the charging mechanism includes two end members 23 and 24, between which the charge is inserted and by which it is carried into the grate section in charging position $a$. These members in effect constitute a movable container conforming to the internal outline of the grate section and to the entrance 22 of the charging chamber, which is of approximately the same area as the chamber. The front end member 23 takes up a position in the said entrance 22, and the rear end member 24 takes up a position in a pocket 91 in the side casing member 15. When in these positions, which are the positions they assume when they have carried a charge into the grate section, they permit the grate to advance to carry the charge from between them into the furnace chamber and to bring an empty grate section to position $a$. The members 23 and 24 are then movable toward the front of the furnace, the member 23 traversing the charging receptacle 25 and the member 24 passing through the empty grate section and taking up a position at the entrance 22. This position is shown in Fig. 22, and the charging position in Figs. 7 and 8, while a transitional condition is illustrated in Fig. 21. The rear end member 24 is secured to and moved by rods 92, which are received in grooves 93 in the casing 17 (see Figs. 16, 6 and 7), so that these rods constitute no obstruction to the rotation of the grate.

Means are provided for closing the entrance 22 to the charging chamber, whereby the charging operations are performed without admission of cool air or escape of gases. To this end we provide inner and outer seals carried by or movable with the back and front ends 24 and 23. These seals are shown in the form of beveled surfaces 94 and 95 formed on the members 23 and 24 and a cooperating double beveled rib 96 formed on the interior of the entrance 22. The mechanism for operating the members 23 and 24 is of such character that they travel simultaneously and at a substantially fixed distance when moving rearward to carry the charge into the grate section at $a$, but move successively in the opposite direction, the member 23 with its seal not moving away from the entrance 22 until the member 24 has completed the major portion of its forward movement and is consequently in a position immediately to close the entrance when vacated by the member 23. To this end power means are provided for operating the charging members 23 and 24, together with controlling means preferably having a single controlling lever or the like whereby the rear end 24 is moved forward independently of the member 23, which remains stationary, and whereby the said member 23 is automatically caused to commence its outward travel after a predetermined movement of the member 24.

The preferred means for operating and controlling the charging members will now be described.

Referring more particularly to Fig. 14, the front end member 23 is operated by a fluid pressure cylinder 97 and a piston and ram 98. The rear end of the latter is secured to the end of a slotted trunk 99, the rear end of which is fixed to the member 23. The ram 98 constitutes a fluid pressure cylinder for operating the rear end member 24, containing a piston 100 fixed to a hollow ram 101, which in turn is fixed to a cross-head 102, operating in the slots of the trunk 99 and secured to the rods 92 which carry the member 24. The rams are controlled by a piston valve 103, slidable in a casing 104 and operated by a hand lever 105. A fluid pressure pipe 106 communicates with the said cylinder 104 and with constant pressure pipes 107 and 108 leading, respectively, to the rear ends of the cylinders 97 and 98. The pipe 108 passes through the two pistons, which are slidable relatively to it, and communicates with the rear end of the cylinder 98 by way of an opening 109 in the hollow ramrod 101. Pressure pipes 110 and 111 lead from the valve cylinder 104 to the front ends of the cylinders 97 and 98 respectively, the pipe 111 passing with a sliding joint through the piston in the cylinder 97.

When the operating lever 105 is in the position shown in Fig. 21, the pressure pipe 110 is connected with the supply so that the piston in cylinder 97 is held in its rearmost position by the fluid pressure in that cylinder, thus holding the charging member 23 in position closing the entrance 22 of the charging chamber, as shown in Fig. 21. The front end of the cylinder 98, however, is connected with the exhaust 112 so that the pressure against the rear side of the piston 100 moves the latter forward, thus causing the rear end charging member 24 to travel forward through the empty grate section, as is shown in Fig. 21. When the valve is in intermediate position, as shown in Fig. 22, the front end of the cylinder 97 is also connected with the exhaust, and the pressure on the rear side of the piston secured to the ramrod 98 moves the latter forward, thus advancing the front end member 23 away from the entrance 22 to the forward part of the charging receptacle 25. The result is that both the members 23 and 24 are brought into their extreme forward positions, ready to have material placed between them to constitute a charge for insertion into the empty grate section in position a. With the valve in the position shown in Fig. 23, both of the ram cylinders 97 and 98 are cut off from the exhaust and are in communication with the fluid pressure pipe 106, so that the fluid pressure admitted to the forward ends of both cylinders overcomes the lesser pressure against the rear sides of their pistons, thereby driving both pistons rearward and causing the charging members 23 and 24 to move simultaneously to carry the new charge into the grate.

Means are provided for automatically tripping the valve mechanism from the position of Fig. 21 to that of Fig. 22. To this end one of two guide rods 92ª, which are secured to the cross-head 102 and may constitute forward extensions of the rods 92 already referred to, has a bracket 113, to which is pivoted a tripping lever 114, the latter being yieldingly held out of tripping position by a weight 115 secured to a lever 116, which is connected to the lever 114 by a link 117. The lever 114 carries a roller 118, which is arranged to contact with an incline 119 on a cam plate 120 carried by a fixed bracket 121. As the rear end member 24 moves forward the roller 118 rides up on this incline and along the straight surface 122 which holds the lever in tripping position, as shown in Fig. 26, the weighted lever 116 being tilted against the force of gravity. In this position the tripping arm of the lever 114 contacts with the end of a trip-rod 123, which is connected by a link with a two-armed motion lever 124, which is connected by another link with the valve 103. The cam plate 120 is so positioned and proportioned that the rod 123 is pushed forward by the lever 114 only sufficiently to move the valve in the intermediate position of Fig. 22. When the parts have reached this position the roller 118 rolls off the straight surface 122, thus permitting the weight 115 to draw the tripping arm of the lever backward and sidewise, so that the lever may advance with the further movement of the member 24 without further operation of the rod 123. It will be obvious that any suitable expedient may be employed for preventing the valve mechanism being thrown by momentum past the desired intermediate position.

On the return stroke the roller 118 rides up the incline 125 on the other side of the plate 120, thereby displacing the weighted lever 116 to the other side of center. The tripping member is thus caused to move around one side of the cam plate in advancing and around the other side in retreating. The displacement of the tripping lever 114 on the return stroke, as indicated in dotted lines in Fig. 26, is due to the fact that the point of the incline 119 must extend sufficiently to the side of the normal path of travel of the roller 118 to insure that the latter will ride up on the incline 119 and not pass at the back of the plate on the forward stroke.

In operating the charging mechanism, therefore, the hand lever 105 is shifted manually from the extreme rearward position shown in Fig. 3, corresponding to the condition of the valve 103 shown in Fig. 23 and the rearward position of the charging members 23 and 24 shown in Figs. 7 and 8, to the extreme forward position shown in Fig. 21. As already explained this causes the rear end member 24 to advance, the front end 23 remaining stationary until the member 24 reaches it. The tripping lever 114 now automatically moves the linkage and the valve to the intermediate position of Fig. 22, when as already explained the front end 23 is set in motion, and the members 23 and 24 advance substantially in contact until the sealing surface 95 on the rear end member 24 contacts with the rib 96, against which it is tightly held by the fluid pressure, the member 24 then being held in the position shown in Fig. 22, sealing the entrance to the charging chamber, while the front end member 23 continues its forward movement. The interval elapsing between the breaking of the outer seal by the forward movement of the member 23 and the closing of the inner seal by the seating of the member 24 is slight, and during this period the entrance 22 is to all intents and purposes closed by the members 23 and 24, so that there is practically no opportunity for gases to escape or air to enter. The parts are now in the position shown in Fig. 22, and a new batch of material is inserted between the members 23 and 24, either by being raked in or by mechanical or automatic means. This having been accomplished the controlling lever 105 is thrown to the extreme rearward position of Fig. 3 moving the valve 103 to the position shown in Fig. 23, and causing both charging members or container ends 23, 24 to move rearward from the receptacle 25 to carry the new charge into the waiting grate section. During this movement the charge itself and the excess material in the container 25 effectually close the entrance 22 to the charging chamber, until such time as the sealing surface 94 of the front end member 23 contacts with the sealing rib 96, thereby sealing the entrance throughout the drying operation and until the next forward movement.

The receptacle 25 may be disposed below a charging floor or a hopper bottom, having an opening 126 adapted to be closed by a cover slide 127 carried by or movable with the front end member 23, so that the opening is uncovered when the members 23, 24 are in charge-receiving position.

It will be noted that the rear end member 24 may be utilized to clear the successive empty grate sections of adhering clinker. Such material would be carried over into the receptacle 25 from which it would be removable through a door 128. In fact this member may be the regular agency for keeping the grate sections free of adhering lumps, the cleaner 86 being used only occasionally or as an emergency device.

*Grate-operating mechanism.*—The means for operating and controlling the movements of the grate are illustrated more particularly in Figs. 2 to 4 and 10 to 13. It comprises suitable power means for rotating the grate, detent means for stopping the grate after a quarter turn (or the appropriate distance depending on the number of grate units), and means for releasing the detent and throwing on the power to start and whereby the detent is automatically engaged and the power thrown off at the conclusion of the predetermined movement. Means are provided whereby the power for driving the grate completes the coupling movement of the clutch after the clutch members have been partially engaged by hand or otherwise. In the particular construction shown the rear end of the drum 42 is provided with a bevel gear ring 129 which is meshed by a bevel pinion 130 mounted loosely on the shaft 131 of a motor 132. The said pinion 130 has a relatively fixed clutch member 133 thereon, and a slidable clutch member 134 is splined on the shaft. A detent lever 135, shown more particularly in Fig. 12 is loosely mounted on the same shaft 131, and its detent end 136 is adapted to engage lockingly with notches 137 in a ring 138 carried by the end of the drum 42. The clutch member 134 and the detent lever 135 are connected together for conjoint operation, and means are provided for operating them manually or otherwise to start and automatically to stop the grate. In the particular construction shown the clutch member 134 is shifted by the immediate action of a bell-crank fork lever 139, which is connected by a link rod 140 and a crank arm 141 to a rock shaft 142, to which the detent lever 135 is also connected by a link rod 143 and a crank arm 144. The rock shaft 142 passes across to the front of the furnace, where it is provided with an operating hand lever 145 (see Figs. 1 and 3). A weight 146 carried by the detent lever 135 serves to automatically reëngage the detent lever 135 and to disengage the clutch member 134 when the next notch 137 comes under the detent end 136. The rear sides of the notches 137 are beveled as shown at 147 in Figs. 10 and 11, sufficient perpendicular wall being left below these bevels to insure solid holding of the grate drum by the detent. In operation, these bevels enable the grate when once set in motion, or rather the power driving it, to complete the engagement of the clutch, by reason of the detent lever 135 riding up on the bevel as the drum commences to turn, thereby sliding the clutch member 134 into full engagement with the clutch member 133.

*Operation.*—The operation of the several groups of parts and mechanism has been explained with the foregoing description of structure, and a brief summary will therefore be sufficient. Let it be assumed that a charge is in process of burning in the grate section *b* of Fig. 1, that the grate section *c* contains clinker through which the forced draft is passing by way of the open valve 44 to the burning section *b*, that the inverted section *d* has dumped its contents, and that the section *a* contains a drying charge through which the hot combustion gases are passing from the combustion chamber by way of the flue 26 back to the furnace chamber by way of the openings 31. The burning of the charge in the grate section or unit in position *b* being completed, the hand lever 145 is pulled down so as to engage the clutch members 133, 134 and to disengage the detent lever 135, thereby causing the grate to be turned the distance of one step, when the clutch is automatically disconnected and the detent lever reëngaged, as already explained, to stop the drum. This movement has carried the grate section formerly in the furnace chamber in position *b* to position *c* in the cooling chamber, the section formerly in position *c* to position *d*, thereby dumping the cooled clinker onto the conveyer 36, the empty grate section formerly occupying this position to position *a* in the charging and drying chamber, and the charged section formerly in position *a* into the furnace chamber, where the thoroughly dried and preheated charge ignites immediately from the heat stored in the furnace chamber. Thus, the operations of introducing a new charge into the furnace chamber, of transferring the clinker resulting from the last charge from the furnace chamber to the cooling chamber, and of removing the preceding cooled clinker from the cooling chamber, are performed simultaneously in a very short period of time, and without opening of doors into the furnace or interference with the forced draft. The cooled clinker delivered from the grate is taken care of automatically and mechanically in a sealed chamber as already described. At any suitable time during the burning of the charge the charging mechanism is operated to move the charging members 23, 24 transversely of the grate to receive another charge and to carry it back into the empty grate section in position *a*. The operation of the charging mechanism has already been fully described, and it will be remembered that means are provided in this connection for preventing inrush of air or escape of noxious gases by way of the charging chamber.

If desired the burning section of the grate may be charged through an opening in the top of the furnace chamber closed by a cover 148. A door 149, suitably closed under normal conditions, affords access to the furnace chamber and enables stoking to be performed if desirable or necessary. A burner 150 is provided to start the burning of the first charge or charges, and it may be utilized to assist burning at any time that it may be required. An opening 151, suitably closed, is for the purpose of introducing carcasses of animals into the combustion chamber, where they are consumed in the hottest part of the furnace. The heat of the burning refuse is utilized in the usual or any approved manner to develop power by means of the boiler.

Fig. 36 illustrates the fact that a series of rotary grates 14, with their axes in parallel alinement, may be installed in a common combustion or furnace chamber 1ª, communicating with a common secondary combustion chamber. The flame and products of combustion flow through the common combustion chamber lengthwise of the series, and deflecting arches 3ª are disposed between the several grates and between the last grate and the combustion chamber. A common dumping chamber extends beneath all of the grates, and a common conveyer therein conducts the clinker to a disintegrator in an adjoining pit. The common chamber beneath the grates is cut off from the combustion chambers, and the forced draft is supplied independently to the several grate compartments in burning position, by way of the grate compartments in cooling position.

While the furnace is designed more especially for use as a refuse destructor, it will be understood that the invention may be applied to any use for which it may be suitable and that apparatuses embodying part or all of the features illustrated herein may be utilized in a variety of combustion processes. It will also be understood that the invention is not limited to the exact details of construction shown, and that numerous changes and omissions in form, arrangement, details and mode of operation may be made without departing from the invention.

What we claim as new is:

1. The combination with a combustion chamber, of a grate support rotatable about a horizontal axis and divided into a series of walled-off compartments, individual grates therein, and means for successively covering and inclosing the grate compartments so as to form a charging chamber cut off from the furnace chamber.

2. The combination with a combustion chamber, of a drum-like grate rotatable about a horizontal axis and comprising a circular series of grate compartments adapted to be substantially non-communicating, and an incasing structure having an arcuate wall arranged to coöperate successively with said compartments so as to closely cover the same, said incasing structure having an entrance permitting said compartments to be charged while covered by said wall.

3. The combination with a combustion chamber, and a grate support rotatable about a horizontal axis and carrying a circular series of individual grates arranged in compartments walled-off one from another and adapted to be brought one after another under the combustion chamber, of an incasing structure and sealing means coöperative with the grate compartments to cut off the same successively from the combustion chamber previous to being brought into registry therewith.

4. The combination with a furnace chamber, of an endless movable grate, comprising a series of separate compartment sections movable in a vertical circuit, a wall past which said sections move to enter the furnace chamber and which separates them from the furnace chamber before entering the same, means for mechanically charging said sections before reaching the furnace chamber, a dumping chamber cut off from the furnace draft, and inclosed means for removing the material dumped into said dumping chamber.

5. The combination with a furnace chamber, of a movable grate, comprising a series of compartment sections movable in a vertical circuit, a wall past which said sections move to separate them from the furnace chamber, and horizontally-movable mechanical charge-introducing mechanism, acting transversely of the grate and parallel to the compartment sections to charge the sections while separated from the furnace chamber by said wall.

6. In a furnace, the combination with a furnace chamber, of a rotary grate divided into compartments, and mechanical charging means acting parallel to the axis of the grate for charging said compartments through their ends.

7. In a furnace, the combination with a furnace chamber, of a grate comprising compartment sections adapted to move into and beyond said furnace chamber, and means for isolating the sections from the furnace draft before entering the furnace chamber, comprising a wall past which said sections move and a valve operable between the sections.

8. In a furnace, a furnace chamber and a movable grate comprising compartment sections adapted to move into and beyond said furnace chamber and automatic valves in the grate operating successively to cut off communication between the section in said chamber and the succeeding section.

9. In a furnace or the like, a combustion chamber, and a horizontal axis rotary grate having a series of grate compartments adapted to register successively with said combustion chamber and embodying means adapted to cut off internal communication between said compartments, in combination with external means coöperative with the grate to cut off said compartments from the combustion chamber before entering the same, means for causing a heated draft current to pass through each compartment in succession when so cut off from the combustion chamber, and means for supplying a separate draft current to support combustion to each compartment when in the combustion chamber.

10. In a furnace, the combination of a grate rotatable about a horizontal axis and having outward-facing compartments disposed around said axis, means for successively charging the grate compartments, a combustion chamber where the charges of said compartments are burned successively, means confining the charges in compartments successively in a closed space separate from and in advance of the combustion chamber, and means for passing heated fluid through said space.

11. In a furnace, the combination of an endless progressive grate comprising a series of sections, a furnace chamber where the grate sections are burned in succession, means coöperating with the grate and affording a preheating chamber separate from the furnace chamber, and means for conducting volatile gases from the charges of successive grate sections occupying the preheating chamber to mix with the current of combustion gases leaving the furnace chamber.

12. The combination of a combustion chamber, a rotary grate comprising compartment sections moved by the rotation of the grate into and out of said combustion chamber, a wall conforming to said grate sections and coöperating successively therewith to form a preheating or coking chamber in advance of the combustion chamber, said wall having passages therein leading to and from such preheating chamber, and said wall having passages therein leading to and from such preheating chamber, and means for causing heated fluid to flow through said passages and preheating chamber.

13. In a furnace, the combination with a furnace chamber, of a movable grate comprising compartment sections, a wall separating said sections from the furnace chamber before entering the same, mechanical means for introducing a charge into each section before entering the furnace chamber, and means for causing heated fluid to flow through the charged sections before entering said furnace chamber.

14. In a furnace, a rotary drum grate comprising compartment sections, a casing partially inclosing said grate and coöperating with said sections successively to form an inclosed charging chamber, and plunger mechanism for charging said chamber through its end.

15. In a furnace, a furnace chamber, an endless movable grate comprising compartment sections movable in a vertical circuit, means coöperating with said sections at a certain stage in their progress to form an inclosed charging chamber separate from said furnace chamber, and plunger mechanism for charging said charging chamber without admission of air thereto or escape of gases therefrom.

16. In a furnace, the combination of a furnace chamber, means for forming an inclosed charging chamber separate therefrom and having a charging entrance, a grate comprising compartment sections movable from charging position to said furnace chamber, and mechanism operable through said entrance to introduce a charge into the grate section in charging position, said mechanism including inner and outer independently movable closures for said entrance.

17. In a furnace, the combination of a furnace chamber, a separate charging chamber having a charging entrance, means for carrying the charge from the charging chamber to the furnace chamber, and charging mechanism operable through said charging entrance into the charging chamber and including inner and outer independently movable closures.

18. In a furnace, a movable grate comprising a series of open-ended compartment sections, and charge end retainers reciprocable transversely of the grate, being movable from positions at opposite ends of a compartment, in which position they permit said compartment to advance, to charge-receiving positions in which both are at one side of the grate, and back again to introduce the charge into the next compartment.

19. In a furnace, the combination with a furnace chamber, of a progressive grate comprising compartment sections open at the top and ends, a wall arranged to cover said sections before entering said furnace chamber so as to form a separate charging chamber, charging members reciprocable transversely of the grate and adapted to take up grate-unobstructing positions at opposite ends of such charging chamber, and operating connections for one of said members operating in said wall free of the grate sections.

20. In a furnace, the combination of a furnace chamber, a charging chamber, charge-end retainers for introducing a charge into said charging chamber, and a movable grate member for transferring said charge from between said retainers from said charging chamber to said furnace chamber.

21. In a furnace, the combination of a sectional progressive grate, an open top charging receptacle with which said sections successively aline transversely, means for forcing a charge from said receptacle into the charging grate section and a cover for the container operated by said means.

22. A furnace having a progressive compartment grate, a charging opening with which said compartments register successively, front and rear members for introducing successive charges through said entrance into the grate compartments and for closing said entrance, power means for moving said members, and controlling means for causing said power means to drive said members rearward in unison and forward in succession.

23. In a furnace, a grate comprising a series of compartments movable in a vertical circuit, and means for advancing the same at suitable intervals, in combination with an incasing structure coöperating with said grate so as to form a combustion chamber and a cooling chamber beyond the combustion chamber and cut off from open communication therewith, both chambers being at the outer side of the grate, and means for passing the draft to the compartment in the combustion chamber through the burned material in the compartment occupying the cooling chamber.

24. In a furnace, the combination of a furnace chamber, means affording a pre-heating chamber and a cooling chamber, a progressive grate for carrying successive charges from the pre-heating chamber to the furnace chamber and thence to the cooling chamber, means for passing heated fluid through the charge carried by the portion of the grate in the pre-heating chamber, and means for passing the draft to the furnace chamber through the burned material carried by the portion of the grate in the cooling chamber.

25. In a furnace, the combination with a furnace chamber, of a rotary grate comprising compartment sections, a wall at the far side of the furnace chamber coöperating successively with said grate sections to form a cooling chamber separated from said furnace chamber, and means for producing a forced draft and directing it through said cooling chamber.

26. In a furnace, the combination with a furnace chamber and a cooling chamber, of a progressive grate comprising compartment sections movable from the furnace chamber into the cooling chamber, which said chambers are cut off from open communication with each other, automatic valve means for establishing communication between the grate sections in the cooling and furnace chambers, and means for causing a draft current to pass through the section in the cooling chamber and thence to the section in the furnace chamber.

27. In a furnace, the combination with a furnace chamber, of a progressive grate comprising a series of compartment sections, walls coöperating with the grate sections at opposite sides of the grate section in the furnace chamber to form preliminary treatment and cooling chambers cut off from open communication with said furnace chamber, means for passing heated fluid through the grate section in the preliminary treatment chamber, and means for causing the draft to the grate section in the furnace chamber to pass through the section in the cooling chamber.

28. In a furnace, the combination with a furnace chamber, of a progressive grate comprising a series of compartment sections, walls coöperating with the grate sections at opposite sides of the grate section in the furnace chamber to form pre-heating and cooling chambers cut off from open communication with said furnace chamber, means for passing heated fluid through the grate section in the pre-heating chamber, means for causing the draft to the grate section in the furnace chamber to pass through the section in the cooling chamber, and automatic means in the grate for cutting off communication between the grate sections in the furnace and pre-heating chambers and establishing communication between the sections in the furnace and cooling chambers.

29. In a furnace, the combination with a furnace chamber, of a progressive grate comprising a series of compartment sections, stationary means coöperating successively therewith at the far side of the furnace chamber to form a cooling chamber cut off from open communication with said furnace chamber, and means for passing cooling fluid through the burned charge carried by the section of the grate in said chamber.

30. A refuse destructor, comprising, in combination with a combustion space and a dumping space beneath the same, a series of grate compartment sections separated from each other by draft controlling provisions and movable in a cycle from burning position in the combustion space, away from the same and downward to the dumping space where they are adapted to dump the clinker, and up and back to the combustion space, means for successive charging of the sections, means coöperating successively with the charged sections to separate them from the combustion space before entering the same, means for causing heated fluid to pass through the contents of the successive charged sections when thus separated from the combustion space, and means for causing a cooling draft current to pass through the contents of the successive burned sections.

31. A refuse destructor, comprising, in combination with a combustion space and a dumping space beneath the same, a series of grate compartment sections separated from each other by draft controlling provisions and movable in a cycle from burning position in the combustion space, away from the same and downward to the dumping space where they are adapted to dump the clinker, and up and back to the combustion space, mechanism for charging the sections between dumping and burning positions without admission of air to the furnace or escape of gases, means coöperating successively with the charged sections to separate them from the combustion space before entering the same, means for causing heated fluid to pass through the contents of the successive charged sections when thus separated from the combustion space, and means for causing a cooling draft current to pass through the contents of the successive burned sections and thence through the contents of the burning section.

32. A refuse destructor, comprising, in combination with a combustion space and a closed dumping space beneath the same, a series of grate compartment sections separated from each other by draft controlling provision and movable in a cycle from burning position in the combustion space, away from the same and downward to the dumping space where they are adapted to dump the clinker, and up and back to the combustion space, means whereby the sections after dumping are charged successively without admission of air or escape of gases, means coöperating successively with the charged sections to separate them from the combustion space before entering the same, means for causing heated fluid to pass through the contents of the successive charged sections when thus separated, means for causing a cooling draft current to pass through the contents of the successive burned sections, and inclosed means for automatically removing the clinker from the dumping space.

33. A furnace, comprising in combination, with a combustion space and a dumping space, a progressive grate comprising a series of grate compartment sections and draft controlling provisions separating the sections from each other, said sections moving successively through a cycle from burning position in the combustion space downward to dumping position over the dumping space and back to burning position, means for supplying forced draft to the successive sections in burning position, and relatively stationary means coöperating with the grate and the draft controlling provisions thereof to cut off the dumping space from the combustion space and said forced draft.

34. A refuse destructor having a combustion space, a closed clinker chamber, inclosed means for removing the residual material therefrom, an endless progressive grate composed of compartment sections movable in a cycle from burning position above in communication with the combustion space to a position below where their contents are discharged into the clinker chamber and back again to burning position, being charged meanwhile, means for forcing draft current through the sections occupying certain positions in the cycle, and draft controlling provisions internal and external to the grate cooperative to cut off the clinker chamber from said draft current.

35. In a furnace, the combination of a combustion space, a dumping space, an endless progressive grate composed of compartment sections movable in a cycle from burning position above in communication with the combustion space to dumping position below and back again, being charged meanwhile, means for causing a forced draft to traverse part of the grate, and draft controlling provisions internal and external to the grate and including yielding sealing means for cutting off the dumping space from the forced draft and the combustion space.

36. In a furnace, in combination with a combustion space, a grate rotatable about a horizontal axis and comprising a series of compartment sections disposed around said axis and having means controlling the draft communication between the sections, said sections being brought successively into burning position in communication with the combustion space, thence passing to a cooling position and thereafter dumping their contents, means separating the successive cooling sections from the combustion space, and means for passing a draft through the contents of each cooling section and thence through the burning section.

37. In a furnace, in combination with a combustion space above and a dumping space below, a grate rotatable about a horizontal axis and comprising a series of compartment sections disposed around said axis and having means controlling the draft communication between the sections, said sections being brought successively into burning position in communication with the combustion space, thence passing to a cooling position and thereafter dumping their contents, means separating each cooling section from the combustion space on the one hand and the dumping space on the other hand, and means for forcing cooling fluid through the contents of the successive cooling sections.

38. In a furnace, in combination with a combustion space, a grate rotatable about a horizontal axis and comprising a series of compartment sections disposed around said axis and having automatic valved draft controlling means for cutting off and opening draft communication between the sections, said sections successively occupying burning position at the top in communication with the combustion space and becoming successively inverted at the bottom in dumping condition, external means coöperating with the grate sections to form preheating and cooling chambers at opposite sides, means for passing a cooling draft current through the contents of the cooling chamber and thence via the valved draft controlling means through the burning section, and means for passing a heating draft current through the contents of the preheating chamber.

39. In a furnace, in combination with a combustion space, a grate rotatable about a horizontal axis and comprising a series of compartment sections disposed around said axis and having automatic valved draft controlling means for cutting off and opening draft communication between the sections, said sections successively occupying burning position at the top in communication with the combustion space and becoming successively inverted at the bottom in dumping condition, mechanism for successively re-charging the empty sections without admission of air or escape of gases, external means coöperating with the grate sections to form preheating and cooling chambers at opposite sides, means for passing a cooling draft current through the contents of the cooling chamber and thence via the valved draft controlling means through the burning section, and means for passing a heating draft current through the contents of the preheating chamber.

40. In a furnace, the combination of a rotary sectional grate, a furnace chamber above said grate, a dumping chamber below said grate, means at opposite sides of the grate affording chambers cut off from open communication with said furnace chamber, means for successively charging the grate sections while in one of said side chambers, and means for passing cooling fluid through the grate sections while in the other side chamber.

41. In a furnace, a series of open compartment grates successively movable into burning position, means for closing each grate before reaching burning position, and means for causing heated fluid to pass through the charge in said closed grate.

42. In a furnace, a series of open compartment grates successively movable into and beyond burning position, means for closing each grate after leaving burning position, and means for causing fluid to pass through the burned material in said closed grate to extract heat therefrom.

43. In a furnace, a progressive endless series of compartment grates, which travel from burning position at the top to inverted dumping position at the bottom, means for retaining the contents in the several grates as they turn and move downward, and means for passing fluid through the contents of each downgoing grate to extract the heat therefrom.

44. A refuse destructor, comprising, in combination, a sealed furnace chamber, a compound grate intermittently movable to bring a charged section into the furnace chamber and simultaneously to remove a burned section therefrom, means for causing a forced draft to pass through the sections when in the furnace chamber, means affording a separate chamber cut off from the furnace chamber where the sections are charged, and reciprocating power mechanism for charging the sections when in said separate chamber without admission of air to or escape of gases from the furnace chamber.

45. The combination with a furnace chamber, of a compound grate comprising sections movable into and away from the furnace chamber, means for causing a forced draft for supporting combustion in the portion of the grate in burning position to pass through a previously burned portion of the grate to cool the contents thereof and preheat the draft, and a chamber sealed off from the furnace chamber and from said draft where the cooled sections discharge their contents.

46. The combination with a furnace chamber, of an intermittently rotatable horizontal axis grate comprising a series of grate compartments adapted to be substantially non-communicating, means for causing a forced draft to pass through the compartments successively when in burning position, and mechanism for charging said sections before reaching burning position without admission of air to or escape of gas from the furnace, movement of said grate operating to introduce a fresh charge into burning position and to remove a burned charge from the furnace chamber.

47. In a furnace, the combination with a furnace chamber, means affording a cooling chamber, means for causing a forced draft to pass through the material in said cooling chamber on its way to the furnace chamber, and a clinker dumping chamber, of a sectional rotary grate for carrying successive clinkered charges from the furnace chamber to the cooling chamber and thence to the clinker dumping chamber and there dumping it.

48. In a furnace, a progressive grate comprising a series of open ended compartment sections, and a grate cleaner with which said sections successively aline, being formed to fit slidably in the interior of said sections and movable therethrough to remove adhering material.

49. In a furnace, the combination with a rotary compartment grate, of means affording a furnace chamber, a cooling chamber through which the forced draft to the furnace chamber is passed, a clinker dumping chamber, and a charging chamber arranged around said grate, valves controlling the communication between the grate compartments, and means whereby the valves are automatically opened and closed as the grate rotates, the valve between each cooling compartment and each burning compartment being opened.

50. In a furnace, the combination with a furnace chamber, and casings at the sides of said chamber, of a progressive grate comprising a series of compartment sections adapted to be brought successively into burning position between said casings, of means affording a cooling chamber separate from and beyond said furnace chamber, means for delivering forced draft to said cooling chamber and thence through the grate section in the furnace chamber, and means for diverting part of said draft through said side casings.

51. The combination with a rotary compound grate, comprising a plurality of grate compartments adapted to be substantially non-communicating, and means for rotating the same at intervals so as to cause said compartments to occupy a series of predetermined positions, of a frame in which said grate rotates comprising side casings and arcuate peripheral casings, the latter registering with and closely covering the grate compartments in certain of said positions.

52. The combination with a progressive grate comprising a series of compartment sections, of stationary side walls between which said compartments travel, and yieldable devices sealing between the sides of said grate and said walls and cutting off communication between said sections at the ends.

53. The combination with a rotary grate comprising a series of circularly arranged compartment sections, stationary side members between which said compartments travel, yieldable rings sealing between the sides of the grate and said side members, and yieldable plates also sealing between the sides of the grate and said side members and located between the sections.

54. In a furnace, the combination of side casings, a grate rotatably mounted between said casings and comprising a drum with radial wings and box-like grate units in the compartments thus formed, and yielding sealing plates coöperating with said wings and said side casings.

55. In a furnace, the combination of side casings, a grate rotatably mounted between said casings and comprising a drum with radial wings and box-like grate units in the compartments formed by said wings, and yielding sealing rings coöperating with said side casings and said drum.

56. In a furnace, the combination of a progressive grate having transverse walls dividing it into compartments adapted to be substantially non-communicating, and a transverse yielding sealing device coöperating with said walls.

57. In a furnace, the combination, of a progressive grate comprising a series of compartment sections, a stationary wall or casing part coöperating successively with said compartments to separate adjacent compartments from each other, and a transverse sealing member making the separation tight.

58. The combination of a rotary compartment grate movable at intervals so as to advance its compartments respectively from one to another of a succession of predetermined positions, an incasing structure coöperating with the compartments in such positions to define separate chambers, and yieldable sealing means for preventing leakage between the grate and incasing structure from one chamber to another.

59. The combination of a drum or circular grate rotatable about a horizontal axis, means coöperating therewith and forming a charging chamber, a combustion chamber, a cooling chamber, and a discharging chamber, said chambers being located in the order named around the grate and being separated from each other, and reciprocatory charging mechanism for introducing successive charges into the charging chamber.

60. The combination of a drum or circular grate rotatable about a horizontal axis, and means coöperating therewith and forming a preheating chamber, a combustion chamber, a cooling chamber, and a discharging chamber, said chambers being located in the order named around the grate and being separated from each other.

61. A grate adapted for continuous combustion operations mounted to turn about a horizontal axis and divided into a series of grate compartments with draft controlling walls for separating the compartments from each other, the grate being intermittently rotatable by distances proportional to the divisions of the grate so as to cause each compartment to occupy in succession a series of definite and distinct positions of rest, in combination with relatively stationary draft controlling walls or casing parts coöperating with the compartments at such positions and forming separate chambers around the grate from one to another of which the compartments transfer their charges.

62. The combination of a grate mounted to turn about a horizontal axis and comprising a series of grate compartments with means for controlling draft communication therebetween, means for intermittently rotating the grate so as to transfer the compartments from one to another of a series of definite and distinct positions of rest, relatively stationary draft controlling means coöperating with the compartments at such positions and forming separate chambers, and means for supplying a blast to the material in one of such chambers.

63. In a combustion apparatus, the combination of a grate rotatable about a horizontal axis and comprising a series of grate compartments with draft controlling means for separating them from each other, means for rotating the grate at intervals and by distances proportional to the divisions of the grate so that each is moved from one to another of a series of definite and distinct positions of rest including a burning position, means coöperating with the compartments successively and forming an inclosed chamber beyond burning position, and means for cooling the material in such compartment.

64. A progressive grate comprising a series of compartments movable in succession into burning position, means coöperating with said compartments to form a separate closed charging chamber having an entrance, means for moving the grate at intervals and by distances such that each movement moves a compartment wholly into said chamber and a preceding compartment wholly out of the same, and reciprocating charge introducing and entrance sealing mechanism operative during the intervals between grate movements.

65. A grate rotatable about a horizontal axis and comprising a series of separate grate compartments, means coöperating therewith and forming a series of separate chambers around the grate, including a preheating or coking chamber, a combustion chamber, and a cooling chamber, and means for intermittently rotating the grate by distances such that each movement introduces a compartment into each of said chambers and removes a preceding compartment therefrom.

66. A grate rotatable about a horizontal axis and comprising a series of separate grate compartments, means coöperating therewith and forming a series of separate chambers around the grate, including a combustion chamber and a cooling chamber, means for causing a cooling draft current to pass through the contents of the compartments when in the cooling chamber, and means for intermittently rotating the grate by distances such that each movement introduces a compartment into each of said chambers and removes a preceding compartment therefrom.

67. A grate rotatable about a horizontal axis and comprising a series of separate grate compartments, means coöperating therewith and forming a series of separate chambers around the grate, including a preheating or coking chamber, a combustion chamber, and a cooling chamber, and means for intermittently rotating the grate by distances such that each movement introduces a compartment into each of said chambers and removes a preceding compartment therefrom, the compartments becoming inverted at the lower part of the grate so as to dump their contents.

68. A grate rotatable about a horizontal axis and comprising a series of separate grate compartments, means coöperating therewith and forming a series of separate chambers around the grate, including a combustion chamber at the top and inclosed chambers at opposite sides of the vertical plane through the axis of the grate, and means for intermittently rotating the grate by distances such that each movement introduces a compartment into each of said chambers and removes a preceding compartment therefrom, the compartments becoming inverted at the lower part of the grate so as to dump their contents.

69. In a furnace, the combination of a combustion chamber, a progressive grate comprising a plurality of compartment sections which are brought successively into burning position by moving the grate at intervals, each movement of the grate serving to introduce a section with a new charge into the combustion chamber and simultaneously remove a section with a burned charge therefrom to cooling position, and means whereby the draft to support combustion passes through the successive burned charges thus moved to cooling position and thence through the grate section in burning position, whereby the heat given up by the burned charges is utilized immediately for the new charges.

70. In a furnace, the combination of a grate mounted to rotate about a horizontal axis and comprising a plurality of separate sections for carrying separate charges, parts coöperating therewith to form a combustion chamber and a separate inclosed cooling chamber having draft communication with the combustion chamber, and means for introducing a forced draft to support combustion to the cooling chamber where it passes through the burned material and thence through the material in the combustion chamber, the grate being turned at intervals to simultaneously introduce a new charge into the combustion chamber and transfer a burned charge to the cooling chamber, whereby the heat of the burned charges is immediately utilized for the new charges.

71. In a furnace or the like, the combination of a rotary drum grate comprising a series of compartments separated by draft-intercepting walls and movable at intervals and by distances such that said compartments occupy a succession of predetermined positions, a combustion chamber with which said compartments register in succession, and a dumping chamber below the grate cut off from said combustion chamber.

72. In a combustion apparatus, the combination of a rotary drum grate comprising a series of compartments separated by draft-intercepting walls and movable at intervals and by distances such that said compartments occupy a succession of predetermined positions, and an incasing structure coöperating with said grate to form separate chambers appropriated to different stages in the combustion process for which the apparatus may be designed.

73. In a furnace or the like, the combination of a rotary drum grate comprising a series of compartments separated by draft-intercepting walls and movable at intervals and by distances such that said compartments occupy a succession predetermined positions, an incasing structure coöperating with said grate to form a series of separate chambers, and means for opening and closing draft communication between the grate compartments in a predetermined manner according to their positions.

74. In a furnace or the like, the combination of a rotary drum grate comprising a series of compartments separated by draft-intercepting walls and movable at intervals and by distances such that said compartments occupy a succession of predetermined positions, an incasing structure coöperating with said grate to form a series of separate chambers, automatic yielding sealing devices preventing leakage between the grate and incasing structure, and automatic means for opening and closing draft communication between the grate compartments in a predetermined manner according to their positions.

75. The combination with an intermittently movable compartment grate and an incasing structure, of one or more slidable sealing members arranged to prevent leakage between the incasing structure and the grate, toggles connected with said members, and weights acting on the toggles.

76. In a furnace or the like, a sealed furnace chamber and a grate setting, in combination with a horizontal axis compartment grate support formed of draft-intercepting walls with grates in its compartments, rotatable at intervals so as to bring said compartments successively into register with the furnace chamber with its walls in close proximity to the walls of the setting, and sealing means operative between the walls of the grate support and setting.

77. In a furnace or the like, a rotary horizontal axis grate comprising a series of grate compartments with draft-intercepting walls separating said compartments, a draft space in its interior and means for automatically opening and closing communication between the compartments and said space, in combination with an incasing structure, and sealing means operative between said incasing structure and the draft-intercepting walls of the grate.

78. In a furnace or the like, the combination of a sealed furnace chamber, a progressive compartment grate movable at intervals and by proportional distances and having draft-intercepting walls separating said compartments, and sealing means coöperating with said walls to preserve the pressure in the furnace chamber.

79. In a furnace or the like, the combination of a sealed furnace chamber, a progressive compartment grate movable at intervals and by proportional distances and having draft-intercepting walls separating said compartments, means coöperating successively with the compartments to form a charging chamber cut off from the furnace chamber, and sealing means coöperating with said walls.

80. In a furnace or the like, the combination of a grate support rotatable about a horizontal axis and comprising draft-intercepting walls forming a series of compartments, grates in said compartments, means for turning said grate support at intervals and by distances such as to cause the compartments to occupy a predetermined series of positions, and external draft-controlling means coöperating with the draft-intercepting walls of the grate support to confine the draft to compartments in certain positions.

81. In a furnace or the like, a rotary horizontal axis grate support having draft-intercepting walls and comprising a series of compartments adapted to be substantially non-communicating and having grates therein, and an incasing structure coöperating with the draft-intercepting walls of the grate support so as to form separate chambers for the reception and successive treatment of the charges.

82. In a furnace or the like, a rotary horizontal axis grate support comprising a draft-intercepting drum and draft-intercepting wings radiating therefrom, and grates in the compartments formed by the drum and wings, in combination with an incasing structure coöperating with the draft-intercepting walls of the grate support so as to form separate chambers for the reception and successive treatment of the charges.

83. In a furnace or the like, a combustion chamber, and a grate comprising a rotary horizontal axis grate support having draft-intercepting walls and comprising a series of compartments containing grates which are brought successively to the combustion chamber, in combination with external means coöperating with the draft-intercepting walls of the grate to form a charging chamber cut off from the combustion chamber.

84. A furnace, comprising a series of compartment grates mounted to rotate about horizontal axes, which axes are in parallelism, and a combustion space common to said rotary grates and arranged to cause the products of combustion to flow lengthwise of the series, the grates being rotatable at intervals by partial revolutions so as to bring successive new charges into burning position and to remove previously burned charges therefrom.

85. A furnace, comprising a series of compartment grates mounted to rotate about horizontal axes, which axes are in parallelism, a combustion space common to said rotary grates and arranged to cause the products of combustion to flow lengthwise of the series, the grates being rotatable at intervals by partial revolutions so as to bring successive new charges into burning position and to remove previously burned charges therefrom, and a common space beneath the rotary grates into which the compartment sections dump their burned contents.

86. A furnace, comprising a series of compartment grates mounted to rotate about horizontal axes, which axes are in parallelism, a combustion space common to said rotary grates, the grates being rotatable at intervals by partial revolutions so as to bring successive new charges into burning position and to remove previously burned charges therefrom, a common space beneath the rotary grates into which the compartment sections dump their burned contents, and common means for removing the material thus deposited in the said space.

87. A furnace comprising a series of compartment grates mounted to rotate about horizontal axes, which axes are in parallelism, a combustion space common to said rotary grates, the grates being rotatable at intervals by partial revolutions so as to bring successive new charges into burning position and to remove previously burned charges therefrom, and a space beneath each grate into which its compartments successively dump their burned contents, said space being cut off from the combustion space.

88. A furnace comprising a series of compartment grates mounted to rotate about horizontal axes, which axes are in parallelism, a combustion space common to said rotary grates, the grates being rotatable at intervals by partial revolutions so as to bring succesive new charges into burning position and to remove previously burned charges therefrom, a common chamber extending beneath the series of grates into which the compartments thereof eventually discharge their burned contents, and means for supplying forced draft independently to the compartments of the respective grates which at any one time are in position in the combustion chamber, the common dumping chamber being cut off from the draft.

In witness whereof we have signed our names in the presence of two subscribing witnesses.

THOMAS W. ATTERBURY.
PERCY W. MATTHEWS.

Witnesses:
SUZZANNAH ATTERBURY,
ADA M. MATTHEWS.